United States Patent
Singh

(10) Patent No.: US 11,544,415 B2
(45) Date of Patent: Jan. 3, 2023

(54) CONTEXT-AWARE OBFUSCATION AND UNOBFUSCATION OF SENSITIVE CONTENT

(71) Applicant: Citrix Systems, Inc., Fort Lauderdale, FL (US)

(72) Inventor: Manbinder Pal Singh, Coral Springs, FL (US)

(73) Assignee: Citrix Systems, Inc., Fort Lauderdale, FL (US)

(\*) Notice: Subject to any disclaimer, the term of this patent is extended or adjusted under 35 U.S.C. 154(b) by 0 days.

(21) Appl. No.: 16/716,669

(22) Filed: Dec. 17, 2019

(65) Prior Publication Data

US 2021/0182439 A1 Jun. 17, 2021

(51) Int. Cl.
*G06F 21/00* (2013.01)
*G06F 21/84* (2013.01)
*G06F 21/62* (2013.01)

(52) U.S. Cl.
CPC ............ *G06F 21/84* (2013.01); *G06F 21/629* (2013.01); *G06F 21/6254* (2013.01); *G06F 2221/031* (2013.01)

(58) Field of Classification Search
CPC .... G06F 21/84; G06F 21/6254; G06F 21/629; G06F 2221/031
See application file for complete search history.

(56) References Cited

U.S. PATENT DOCUMENTS

| | | | |
|---|---|---|---|
| 5,801,697 A * | 9/1998 | Parikh | G06F 3/0481 715/790 |
| 6,429,883 B1 | 8/2002 | Plow | |
| 6,937,730 B1 | 8/2005 | Buxton | |
| 7,729,480 B1 | 6/2010 | Packingham | |
| 8,219,766 B1 * | 7/2012 | Orcutt | G06F 11/1446 707/640 |

(Continued)

FOREIGN PATENT DOCUMENTS

| CN | 102938801 A | 2/2013 |
|---|---|---|
| CN | 103218568 A | 7/2013 |

(Continued)

OTHER PUBLICATIONS

U.S. Appl. No. 16/369,648, filed Mar. 29, 2019, Singh, et al.

(Continued)

*Primary Examiner* — Ghazal B Shehni
(74) *Attorney, Agent, or Firm* — Daly, Crowley, Mofford & Durkee, LLP

(57) ABSTRACT

Techniques are disclosed for context-aware obfuscation and unobfuscation of sensitive content in the display of the sensitive content. An example methodology implementing the techniques includes receiving content for display, the content including metadata indicative of a location of at least one item of sensitive content within the received content, and determining at least one contextual factor. The method also includes, responsive to a determination to obfuscate the item of sensitive content based on the at least one contextual factor, displaying the item of sensitive content in obfuscated form. The method may also include, responsive to a determination to not obfuscate the item of sensitive content based on at least one contextual factor, displaying a non-obfuscated version of the item of sensitive content.

20 Claims, 10 Drawing Sheets

(56) References Cited

U.S. PATENT DOCUMENTS

| | | |
|---|---|---|
| 8,578,504 B2 | 11/2013 | Brown et al. |
| 8,726,343 B1 | 5/2014 | Borzycki |
| 8,799,668 B2 | 8/2014 | Cheng |
| 8,826,169 B1 | 9/2014 | Yacoub |
| 8,914,892 B2 | 12/2014 | Karande et al. |
| 9,015,082 B1 | 4/2015 | Jaiswal |
| 9,082,136 B1 | 7/2015 | Hewinson |
| 9,137,232 B2 | 9/2015 | Eschbach et al. |
| 9,268,398 B2 | 2/2016 | Tipirneni |
| 9,466,266 B2 | 10/2016 | Hildreth et al. |
| 9,574,671 B1 | 2/2017 | Amberg |
| 9,626,528 B2 | 4/2017 | Butler |
| 9,680,836 B2 | 6/2017 | White |
| 9,691,027 B1 | 6/2017 | Sawant |
| 9,767,585 B1 | 9/2017 | Carter, Jr. |
| 9,898,619 B1 | 2/2018 | Hadsall |
| 9,977,909 B1 | 5/2018 | Austin et al. |
| 10,032,037 B1 | 7/2018 | Allen |
| 10,043,033 B1* | 8/2018 | Hadsall .............. G06K 9/00087 |
| 10,255,053 B2 | 4/2019 | Giri et al. |
| 10,305,683 B1 | 5/2019 | Ghafourifar et al. |
| 10,325,103 B1 | 6/2019 | Austin |
| 10,430,350 B1 | 10/2019 | Nimry et al. |
| 10,438,010 B1 | 10/2019 | Goodsitt |
| 10,511,698 B1 | 12/2019 | Chen |
| 10,552,585 B2 | 2/2020 | Verthein et al. |
| 10,614,454 B1 | 4/2020 | Brooks, V |
| 10,664,615 B1 | 5/2020 | Schenkein |
| 10,686,824 B2 | 6/2020 | Petry et al. |
| 10,701,079 B1 | 6/2020 | Ledet |
| 10,853,019 B1 | 12/2020 | Schwabacher |
| 11,184,406 B1 | 11/2021 | Shashank |
| 2004/0193910 A1 | 9/2004 | Moles |
| 2005/0240533 A1 | 10/2005 | Cutter |
| 2005/0277428 A1 | 12/2005 | Nathan Brown |
| 2006/0075040 A1 | 4/2006 | Chmaytelli |
| 2006/0129948 A1 | 6/2006 | Hamzy et al. |
| 2006/0277220 A1 | 12/2006 | Patrick |
| 2007/0005713 A1 | 1/2007 | Levasseur |
| 2007/0103552 A1 | 5/2007 | Patel |
| 2008/0034373 A1 | 2/2008 | Glynn |
| 2008/0103799 A1 | 5/2008 | Domenikos |
| 2008/0148067 A1 | 6/2008 | Sitrick |
| 2008/0226199 A1 | 9/2008 | Breglio |
| 2008/0266467 A1 | 10/2008 | Okamoto |
| 2009/0147958 A1 | 6/2009 | Calcaterra |
| 2009/0257591 A1 | 10/2009 | Mithal et al. |
| 2009/0259967 A1 | 10/2009 | Davidson |
| 2009/0262931 A1 | 10/2009 | Nakagata |
| 2010/0045570 A1 | 2/2010 | Takata |
| 2010/0049743 A1 | 2/2010 | Schmidt |
| 2010/0110095 A1 | 5/2010 | Sekiguchi et al. |
| 2010/0161644 A1 | 6/2010 | Crim et al. |
| 2010/0205667 A1 | 8/2010 | Anderson |
| 2010/0251374 A1 | 9/2010 | Dill |
| 2010/0275267 A1 | 10/2010 | Walker |
| 2011/0029774 A1 | 2/2011 | Zunke |
| 2011/0032913 A1 | 2/2011 | Patil et al. |
| 2011/0088086 A1 | 4/2011 | Swink |
| 2011/0161656 A1 | 6/2011 | Rao |
| 2011/0251992 A1 | 10/2011 | Bethlehem et al. |
| 2011/0258195 A1 | 10/2011 | Welling |
| 2011/0302442 A1 | 12/2011 | Garrett et al. |
| 2012/0005475 A1 | 1/2012 | Inagaki |
| 2012/0023571 A1 | 1/2012 | Spies |
| 2012/0098639 A1 | 4/2012 | Ijas |
| 2012/0110174 A1 | 5/2012 | Wootton |
| 2012/0198368 A1 | 8/2012 | Bornheimer et al. |
| 2012/0226742 A1 | 9/2012 | Momchilov et al. |
| 2012/0260307 A1 | 10/2012 | Sambamurthy |
| 2012/0303558 A1 | 11/2012 | Jaiswal |
| 2012/0323717 A1 | 12/2012 | Kirsch |
| 2013/0007895 A1 | 1/2013 | Brolley |
| 2013/0019186 A1 | 1/2013 | Lance |
| 2013/0054635 A1 | 2/2013 | Phelps |
| 2013/0117670 A1 | 5/2013 | Mahajan et al. |
| 2013/0145457 A1 | 6/2013 | Papakipos et al. |
| 2013/0162817 A1 | 6/2013 | Bernal |
| 2013/0172027 A1 | 7/2013 | Sturges et al. |
| 2013/0201534 A1 | 8/2013 | Carlen et al. |
| 2013/0298076 A1 | 11/2013 | Rice |
| 2013/0339744 A1 | 12/2013 | Nagai et al. |
| 2013/0344966 A1 | 12/2013 | Mustafa |
| 2014/0053232 A1* | 2/2014 | Coles .................. G06F 21/6209 726/1 |
| 2014/0195798 A1 | 7/2014 | Brugger et al. |
| 2014/0201527 A1 | 7/2014 | Krivorot |
| 2014/0215356 A1 | 7/2014 | Brander et al. |
| 2014/0259184 A1 | 9/2014 | Hoyer |
| 2014/0268244 A1 | 9/2014 | Sheridan |
| 2014/0280509 A1 | 9/2014 | Merrells |
| 2014/0283127 A1 | 9/2014 | Chacko |
| 2014/0351955 A1 | 11/2014 | White |
| 2015/0058997 A1* | 2/2015 | Lee ..................... G06F 21/6281 726/26 |
| 2015/0074506 A1 | 3/2015 | Dunn |
| 2015/0074615 A1 | 3/2015 | Han |
| 2015/0089357 A1 | 3/2015 | Vandervort |
| 2015/0113666 A1 | 4/2015 | Buck |
| 2015/0149529 A1 | 5/2015 | Loader |
| 2015/0200922 A1* | 7/2015 | Eschbach ................ H04L 63/08 358/1.14 |
| 2015/0271206 A1 | 9/2015 | Schultz |
| 2015/0278534 A1 | 10/2015 | Thiyagarajan et al. |
| 2015/0281446 A1 | 10/2015 | Milstein |
| 2015/0287279 A1 | 10/2015 | Nichols |
| 2015/0288633 A1 | 10/2015 | Ogundokun et al. |
| 2015/0346959 A1 | 12/2015 | Ruben et al. |
| 2015/0350136 A1 | 12/2015 | Flynn, III |
| 2016/0011731 A1 | 1/2016 | Pasquero |
| 2016/0050526 A1 | 2/2016 | Liu |
| 2016/0054911 A1 | 2/2016 | Edwards et al. |
| 2016/0078247 A1 | 3/2016 | Tucker et al. |
| 2016/0092685 A1 | 3/2016 | Tse |
| 2016/0098414 A1 | 4/2016 | Edmonds |
| 2016/0099935 A1 | 4/2016 | Luskin et al. |
| 2016/0100046 A1 | 4/2016 | Meru |
| 2016/0112209 A1 | 4/2016 | Yoon et al. |
| 2016/0156638 A1 | 6/2016 | Somani |
| 2016/0179454 A1 | 6/2016 | Liu |
| 2016/0188883 A1 | 6/2016 | Wang et al. |
| 2016/0188973 A1 | 6/2016 | Ziaja et al. |
| 2016/0191442 A1 | 6/2016 | Penilla et al. |
| 2016/0255084 A1 | 9/2016 | White |
| 2016/0261735 A1 | 9/2016 | Candelore |
| 2016/0269440 A1 | 9/2016 | Hartman |
| 2016/0270648 A1 | 9/2016 | Freeman |
| 2016/0294823 A1 | 10/2016 | Mckeithan, II |
| 2016/0307002 A1 | 10/2016 | Zha |
| 2016/0328522 A1 | 11/2016 | Howley |
| 2016/0378869 A1 | 12/2016 | Nittka |
| 2017/0004331 A1 | 1/2017 | Weldon |
| 2017/0032150 A1 | 2/2017 | Hamlin |
| 2017/0061409 A1 | 3/2017 | Morecki |
| 2017/0068829 A1 | 3/2017 | Shaw |
| 2017/0134645 A1 | 5/2017 | Kim |
| 2017/0187751 A1 | 6/2017 | Andrews |
| 2017/0249432 A1 | 8/2017 | Grantcharov |
| 2017/0264506 A1 | 9/2017 | Singhal |
| 2017/0323099 A1* | 11/2017 | Song .................... G06F 21/554 |
| 2017/0351909 A1 | 12/2017 | Kaehler |
| 2017/0364595 A1 | 12/2017 | Desai et al. |
| 2017/0372527 A1 | 12/2017 | Murali et al. |
| 2018/0014150 A1 | 1/2018 | Elias |
| 2018/0053003 A1 | 2/2018 | Nair |
| 2018/0054414 A1 | 2/2018 | Levasseur |
| 2018/0071634 A1 | 3/2018 | Carvallo et al. |
| 2018/0082068 A1 | 3/2018 | Lancioni et al. |
| 2018/0122506 A1 | 5/2018 | Grantcharov et al. |
| 2018/0124027 A1 | 5/2018 | Venkiteswaran |
| 2018/0136898 A1 | 5/2018 | Shi et al. |
| 2018/0145835 A1 | 5/2018 | Barbour et al. |
| 2018/0150647 A1 | 5/2018 | Naqvi et al. |
| 2018/0164589 A1 | 6/2018 | Watanabe |

(56) References Cited

U.S. PATENT DOCUMENTS

| | | |
|---|---|---|
| 2018/0165427 A1 | 6/2018 | Verthein |
| 2018/0183581 A1 | 6/2018 | Elbaz et al. |
| 2018/0189461 A1 | 7/2018 | Ghafourifar |
| 2018/0189504 A1 | 7/2018 | Ghafourifar |
| 2018/0189505 A1 | 7/2018 | Ghafourifar |
| 2018/0191686 A1 | 7/2018 | Ghafourifar |
| 2018/0191701 A1 | 7/2018 | Kong et al. |
| 2018/0225019 A1 | 8/2018 | Xie |
| 2018/0262480 A1 | 9/2018 | Doi et al. |
| 2018/0276393 A1 | 9/2018 | Allen et al. |
| 2018/0285591 A1 | 10/2018 | Thayer et al. |
| 2018/0285592 A1 | 10/2018 | Sharifi et al. |
| 2018/0321826 A1 | 11/2018 | Bereza |
| 2018/0337918 A1 | 11/2018 | Chang et al. |
| 2018/0343321 A1 | 11/2018 | Chang |
| 2018/0351961 A1 | 12/2018 | Calcaterra et al. |
| 2019/0012646 A1 | 1/2019 | Seidl et al. |
| 2019/0013646 A1 | 1/2019 | Tan et al. |
| 2019/0019177 A1 | 1/2019 | Lee et al. |
| 2019/0042059 A1 | 2/2019 | Baer |
| 2019/0050592 A1 | 2/2019 | Grau |
| 2019/0068687 A1 | 2/2019 | Masi |
| 2019/0073490 A1* | 3/2019 | Agrawal ............... H04L 63/102 |
| 2019/0080072 A1 | 3/2019 | Van Os et al. |
| 2019/0102263 A1 | 4/2019 | Singh et al. |
| 2019/0102574 A1 | 4/2019 | Roberts et al. |
| 2019/0147169 A1 | 5/2019 | Adams |
| 2019/0171794 A1 | 6/2019 | Dhruva et al. |
| 2019/0220609 A1 | 7/2019 | Ghazanfari |
| 2019/0266337 A1 | 8/2019 | Sengupta |
| 2019/0278940 A1 | 9/2019 | Huang |
| 2019/0278961 A1 | 9/2019 | Schrader et al. |
| 2019/0279344 A1 | 9/2019 | Duggal |
| 2019/0289419 A1 | 9/2019 | Eronen |
| 2019/0306132 A1 | 10/2019 | Le Van Gong |
| 2019/0327215 A1 | 10/2019 | Bastian et al. |
| 2019/0349366 A1 | 11/2019 | Dewan et al. |
| 2019/0361572 A1 | 11/2019 | Webber |
| 2019/0386971 A1 | 12/2019 | Venkiteswaran et al. |
| 2020/0004983 A1 | 1/2020 | Chen |
| 2020/0012793 A1 | 1/2020 | Avraham et al. |
| 2020/0019729 A1 | 1/2020 | Shanmugam et al. |
| 2020/0026394 A1 | 1/2020 | Rodolico |
| 2020/0028836 A1 | 1/2020 | Gandhi et al. |
| 2020/0065514 A1 | 2/2020 | Keen |
| 2020/0074090 A1 | 3/2020 | Naqvi et al. |
| 2020/0074109 A1 | 3/2020 | Pieniazek et al. |
| 2020/0104539 A1 | 4/2020 | Liu |
| 2020/0106749 A1 | 4/2020 | Jain et al. |
| 2020/0110301 A1 | 4/2020 | Harrold et al. |
| 2020/0134240 A1 | 4/2020 | Balakrishna |
| 2020/0151243 A1 | 5/2020 | Chauhan |
| 2020/0151348 A1 | 5/2020 | Chauhan |
| 2020/0153911 A1 | 5/2020 | Chauhan |
| 2020/0175209 A1 | 6/2020 | Yost |
| 2020/0175610 A1 | 6/2020 | Pikle |
| 2020/0193031 A1 | 6/2020 | Avraham et al. |
| 2020/0228561 A1 | 7/2020 | Petry et al. |
| 2020/0310945 A1 | 10/2020 | Scoda |
| 2020/0311304 A1 | 10/2020 | Parthasarathy |
| 2020/0320638 A1 | 10/2020 | Erickson et al. |
| 2020/0349271 A1 | 11/2020 | Binkley |
| 2020/0380146 A1 | 12/2020 | Dodor et al. |
| 2021/0019441 A1 | 1/2021 | Neves Creto |
| 2021/0021573 A1 | 1/2021 | Scotney |
| 2021/0049280 A1 | 2/2021 | Koshy |
| 2021/0051294 A1 | 2/2021 | Roedel et al. |
| 2021/0350033 A1 | 11/2021 | Kapinos |
| 2022/0021721 A1 | 1/2022 | Liu |
| 2022/0164400 A1 | 5/2022 | Holloway |
| 2022/0164472 A1 | 5/2022 | Cannon |
| 2022/0164589 A1 | 5/2022 | Upshinskii |

FOREIGN PATENT DOCUMENTS

| | | |
|---|---|---|
| CN | 104794405 A | 7/2015 |
| CN | 105162693 A | 12/2015 |
| CN | 106716436 A | 5/2017 |
| CN | 106933465 A | 7/2017 |
| CN | 108509169 A | 9/2018 |
| CN | 105976303 B | 3/2019 |
| CN | 110378145 A | 10/2019 |
| CN | 110998573 A | 4/2020 |
| CN | 111338744 A | 6/2020 |
| EP | 2874396 A1 | 5/2015 |
| EP | 3337210 A1 | 6/2018 |
| JP | 2011248762 A | 12/2011 |
| JP | 2012198658 A | 10/2012 |
| KR | 100837815 B1 | 6/2008 |
| KR | 20150066129 A | 6/2015 |
| WO | WO 2013/101084 A1 | 7/2013 |
| WO | 2015120677 A1 | 8/2015 |
| WO | WO2016205241 A | 12/2016 |
| WO | WO2018102286 | 6/2018 |

OTHER PUBLICATIONS

U.S. Appl. No. 16/716,761, filed Dec. 17, 2019, Singh.
U.S. Appl. No. 16/910,615, filed Jun. 24, 2020, Qiao, et al.
U.S. Appl. No. 16/835,928, filed Mar. 31, 2020, Singh.
U.S. Non-Final Office Action dated Dec. 10, 2020 for U.S. Appl. No. 16/780,445; 36 pages.
U.S. Non-Final Office Action dated Feb. 16, 2021 for U.S. Appl. No. 17/034,118; 15 pages.
PCT International Search Report and Written Opinion dated Oct. 27, 2020 for International Application No. PCT/US2020/051150; 12 Pages.
PCT International Search Report and Written Opinion dated Feb. 23, 2021 for International Application No. PCT/CN2020/091951; 9 pages.
PCT International Search Report and Written Opinion dated Feb. 16, 2021 for International Application No. PCT/US2020/061927; 13 pages.
U.S. Non-Final Office Action dated Mar. 4, 2021 for U.S. Appl. No. 17/073,773; 17 pages.
U.S. Non-Final Office Action dated Mar. 15, 2021 for U.S. Appl. No. 16/185,724; 14 pages.
U.S. Appl. No. 16/725,295, filed Dec. 23, 2019, Bhaskar S, et al.
U.S. Appl. No. 16/870,056, filed May 8, 2020, Jiang, et al.
U.S. Appl. No. 16/185,724, filed Nov. 9, 2018, Chauhan.
U.S. Appl. No. 16/780,445, filed Feb. 3, 2020, Singh, et al.
European Search Report and Written Opinion dated Mar. 31, 2020 for EP Application No. 19207955.6; 9 Pages.
U.S. Appl. No. 17/034,118, filed Sep. 28, 2020, Wang, et al.
U.S. Appl. No. 17/073,773, filed Oct. 19, 2020, Qian, et al.
Text Mask: Hide Confidential Page Content—Chrome Web Store; Downloaded from https://chrome.google.com/webstore/detail/text-mask-hide-confidenti/icodoomkkkhijlceahdabhkgdelffail?hl=en; Dec. 13, 2018; 6 pages.
"IBM Researchers Develop Shield To Mask Sensitive On-Screen Info" Downloaded from https://www.firstpost.com/business/biztech/ibm-researchers-develop-shield-to-mask-sensitive-on-screen-info-1873185.html; Jul. 10, 2009; 11 pages.
Goldsteen, et al., "Application-screen Masking: A Hybrid Approach;" Downloaded from https://www.firstpost.com/business/biztech/ibm-researchers-develop-shield-to-mask-sensitive-on-screen-info-1873185.html; Jul. 2015; 10 Pages.
U.S. Non-Final Office Action dated Jun. 6, 2019 for U.S. Appl. No. 16/185,724; 11 Pages.
U.S. Final Office Action dated Oct. 23, 2019 for U.S. Appl. No. 16/185,724; 12 Pages.
U.S. Non-Final Office Action dated Mar. 24, 2020 for U.S. Appl. No. 16/185,724; 11 Pages.
U.S. Final Office Action dated Sep. 9, 2020 for U.S. Appl. No. 16/185,724; 11 Pages.
U.S. Non-Final Office Action dated Apr. 30, 2021 for U.S. Appl. No. 16/369,648; 26 pages.

(56) References Cited

OTHER PUBLICATIONS

U.S. Final Office Action dated May 13, 2021 for U.S. Appl. No. 17/073,773; 14 pages.
PCT International Search Report and Written Opinion dated May 10, 2021 for International Application No. PCT/US2020/062770; 19 pages.
PCT International Search Report and Written Opinion dated May 26, 2021 for International Application No. PCT/CN2020/111793; 9 pages.
PCT International Search Report and Written Opinion dated Jun. 3, 2021 for International Application No. PCT/CN2020/112315; 9 pages.
U.S. Final Office Action dated Jun. 9, 2021 for U.S. Appl. No. 16/780,445; 37 pages.
PCT Invitation to Pay Additional Fees dated Mar. 16, 2021 for International Application No. PCT/US2020/062770; 12 pages.
Bickford et al., "Safe Internet Browsing using a Transparent Virtual Browser", 2015 IEEE 2nd International Conference on Cyber Security and Cloud Computing, pp. 423-432 (Year: 2015).
Forte, Andrea et al., "EyeDecrypt—Private Interaction in Plain Sight", https://citeseerx.ist.psu.edu/viewdoc/download?doi=10.1.1.380.8867&rep=rep1&type=pdf, pp. 1-14 (Year: 2014).
Moreira et al., "Strategies for minimizing the influence of the use of BYOD and Cloud in organizations: 4CM Model", IEEE 11CCC 2016 (Year: 2016).
PCT International Search Report and Written Opinion dated May 27, 2021 for International Application No. PCT/CN2020/112314; 9 pages.
Non-Final Office Action dated Jul. 29, 2021 for U.S. Appl. No. 16/870,056; 11 Pages.
Final Office Action dated Jul. 21, 2021 for U.S. Appl. No. 16/185,724; 14 Pages.
Examination Report dated Aug. 23, 2021 for European Application No. 19207955.6; 5 Pages.
Office Action (Non-Final Rejection) dated Mar. 7, 2022 for U.S. Appl. No. 16/716,761 (pp. 1-23).
Office Action (Final Rejection) dated Jan. 26, 2022 for U.S. Appl. No. 16/870,056 (pp. 1-10).
European Patent Office Communication pursuant to Article 94(3) EPC for App. No. EP19207955.6, dated Mar. 17, 2022, 5 pages.
Office Action (Non-Final Rejection) dated Mar. 30, 2022 for U.S. Appl. No. 16/185,724 (pp. 1-13).
Office Action (Non-Final Rejection) dated Jun. 8, 2022 for U.S. Appl. No. 16/725,295 (pp. 1-13).
Office Action (Final Rejection) dated Jul. 14, 2022 for U.S. Appl. No. 16/780,445 (pp. 1-24).
Office Action (Non-Final Rejection) dated Jul. 8, 2022 for U.S. Appl. No. 16/910,615 (pp. 1-17).
Deep learning for source camera identification on mobile devices By David Freire-Obregón; Fabio Narducci; Silvio Barra; and Modesto Castrillón-Santana pp. 6; Available online Jan. 9, 2018.
Techniques for Position-Based Actions Using Light-Based Communication wo 2015148696 A1 (Machine Translation) Inventors: Aggarwal Anant; Breuer Christian; and Stout Barry pp. 14; Date Published: Oct. 1, 2015.
Camera recognition with deep learning By Eleni Athanasiadou, Zeno Geradts and Erwin Van Eijk pp. 9; (Year: 2018).
Method for Monitoring Event Related To Position_. JP 2001356978 A (Machine Translation) Inventors: I Anson Colin; Hawkes Rycharde Jeffery; McDonnell James Thomas Edward; Wilcock Lawrence and Crouch Simon E pp. 14; Date Published: Dec. 12, 2001.
Office Action (Final Rejection) dated Aug. 11, 2022 for U.S. Appl. No. 16/716,761 (pp. 1-25).
International Preliminary Report on Patentability issued in App. No. PCT/US2020/061927, dated Aug. 18, 2022, 8 pages.
International Preliminary Report on Patentability issued in App. No. PCT/US2020/051150, dated Jun. 30, 2022, 8 pages.
Hover-Over Content for User Interfaces, IPCOM000236793D, May 15, 2014, 37 pages (Year: 2015).
Office Action (Non-Final Rejection) dated Aug. 18, 2022 for U.S. Appl. No. 16/835,928 (pp. 1-24).

\* cited by examiner

CONTEXT-AWARE OBFUSCATION AND UNOBFUSCATION OF SENSITIVE CONTENT

BACKGROUND

Confidential, proprietary, or otherwise sensitive content may be accessed using a variety of devices, both personal and professional. For example, an organization may store confidential documents in cloud/network storage or access confidential information using one or more Software-as-a-Service (SaaS) or remote desktop applications. An organization may grant its employees, contractors, agents, partners, or other persons associated with organization permission to access various types of content over the network, including word processing documents, spreadsheets, image files, text files, and Portable Document Format (PDF) files.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include, by a computing device, receiving content for display, the content including metadata indicative of a location of at least one item of sensitive content within the received content, and determining at least one contextual factor. The method may also include, responsive to a determination to obfuscate the item of sensitive content based on the at least one contextual factor, causing displaying the item of sensitive content in obfuscated form.

In one aspect, displaying the item of sensitive content in obfuscated form includes applying an overlay with distortion effects, applying a transformation, adding an artifact, or redacting the item of sensitive content.

In one aspect, determining the at least one contextual factor includes detecting another user being physically proximate to the computing device based on a security zone associated with the computing device.

In one aspect, detecting the presence of another user in physical proximity to the computing device includes detecting presence within the security zone.

In one aspect, the method may also include, responsive to a determination to not obfuscate the item of sensitive content based on at least one contextual factor, displaying a non-obfuscated version of the item of sensitive content.

In one aspect, the method may also include displaying, via the computing device, a non-obfuscated version of the item of sensitive content within an application window, and wherein determining the at least one contextual factor includes detecting a timeout of an inactivity timer associated with the application window.

In one aspect, the item of sensitive content is displayed in obfuscated form and the method may also include, responsive to a request to unobfuscate the item of sensitive content being displayed in obfuscated form, authenticating the request to unobfuscate the item of sensitive content and displaying of the item of sensitive content to be readable.

According to another illustrative embodiment provided to illustrate the broader concepts described herein, a non-transitory machine-readable medium may encode instructions that when executed by one or more processors cause a process to be carried out. The process may include receiving content for display, the content including metadata indicative of a location of at least one item of sensitive content within the received content, and determining at least one contextual factor. The process may also include responsive to a determination to obfuscate the item of sensitive content based on the at least one contextual factor, displaying the item of sensitive content in obfuscated form.

In one aspect, displaying the item of sensitive content in obfuscated form includes applying an overlay with distortion effects to the item of sensitive content.

In one aspect, displaying the item of sensitive content in obfuscated form includes applying a transformation to the item of sensitive content.

In one aspect, displaying the item of sensitive content in obfuscated form includes redacting the item of sensitive content.

In one aspect, determining the at least one contextual factor includes detecting another user being physically proximate to a computing device being used to display the item of sensitive content based on a security zone associated with the computing device.

In one aspect, the process may also include, responsive to a determination to not obfuscate the item of sensitive content based on at least one contextual factor, displaying a non-obfuscated version of the item of sensitive content.

In one aspect, the process may also include, displaying of the item of sensitive content to be readable within an application window, and wherein determining the at least one contextual factor includes detecting a timeout of an inactivity timer associated with the application window.

In one aspect, the item of sensitive content is displayed in obfuscated form, and the process may also include, responsive to a request to unobfuscate the item of sensitive content displayed in obfuscated form, authenticating the request to unobfuscate the item of sensitive content and displaying a non-obfuscated version of item of sensitive content.

According to another illustrative embodiment provided to illustrate the broader concepts described herein, a system includes a memory and one or more processors in communication with the memory. The processor may be configured to receive content for display, the content including metadata indicative of a location of at least one item of sensitive content within the received content, determine at least one contextual factor, and responsive to a determination to obfuscate the item of sensitive content based on the at least one contextual factor, cause the item of sensitive content to be displayed in obfuscated form.

In one aspect, to determine the at least one contextual factor includes to detect another user being physically proximate to a computing device being used to display the item of sensitive content.

In one aspect, the processor may be also configured to, responsive to a determination to not obfuscate the item of sensitive content based on at least one contextual factor, cause a non-obfuscated version of the item of sensitive content to be displayed.

In one aspect, the item of sensitive content is displayed in obfuscated form, and the processor may be also configured to, responsive to a request to unobfuscate the item of sensitive content being displayed in obfuscated form, authenticate the request to unobfuscate the item of sensitive content and cause a non-obfuscated version of the item of sensitive content to be displayed.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
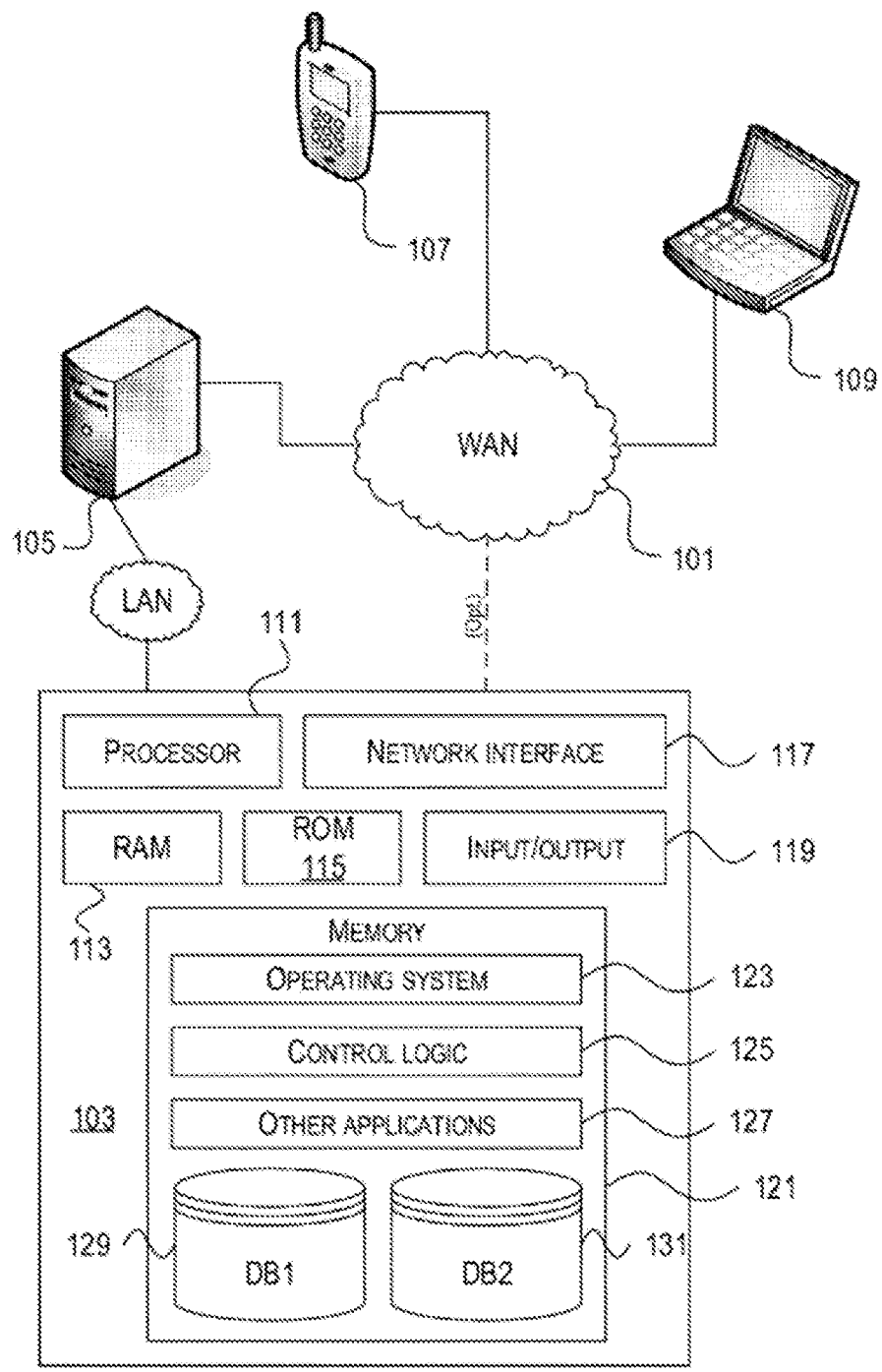
FIG. 1 depicts an illustrative computer system architecture that may be used in accordance with one or more illustrative aspects of the concepts described herein.

When sensitive content is displayed on a display device, for example, the displayed sensitive content may be intended to be viewed only by a specific individual or individuals. However, when sensitive content is displayed, there is a risk that such displayed sensitive content may be leaked or otherwise compromised. For example, unauthorized persons within view of the display device may be able to see sensitive content being displayed.

Concepts, devices, and techniques are disclosed for context-aware obfuscation and unobfuscation of sensitive content in the display of the sensitive content. The obfuscation and unobfuscation determination may be based, at least in part, upon a variety of factors that indicate or otherwise reflect or characterize the environment in which the sensitive content is being (or will be) displayed (i.e., contextual factors). Contextual factors include, but are not limited to, physical proximity of a user or observer near the computing device that is or will be displaying the sensitive content; and inactivity (idle) status of an application being used to access and/or interact with the sensitive content.

These contextual factors provide an indication of the vulnerability of the displayed sensitive content to potential data loss or leakage. The techniques may further provide for unobfuscation of the obfuscated sensitive content. The techniques disclosed herein reduce or effectively eliminate the potential for data loss or leakage caused by the display of sensitive content. These and other advantages, configurations, modifications, and embodiments will be apparent in light of this disclosure.

As used herein, the term "physical proximity", and its variants, refer broadly to physical closeness or nearness between objects. For example, in the context of the display of sensitive content, a user may be considered physically proximate to the display of sensitive content if the user is physically close to the display such that the user is able to view or see the sensitive content. According to some embodiments disclosed herein, physical proximity to an object, such as a display, may be based on presence within a security zone associated with the object. As will be further described below, a security zone is a physical region or zone around an object within which another object may be considered physically proximate the object.

Sensitive or confidential content/information is herein used synonymously to include any content or information that is either legally confidential or identified by a user (i.e., an authorized user) as being only for the eyes of the user themselves, or any one or more other persons authorized by this user. For example, a user may wish to obscure their financial information displayed on their computing device, such as a mobile device, while seated in an airplane. Similarly, an organization may wish to obscure some or all of their corporate information displayed on the computing devices of their employees.

For example, and according to an embodiment, a user may use a computing device to run an application that allows for accessing and/or interacting with content, which may contain (include) one or more items (or elements) of sensitive content. The computing device may be programmed or otherwise configured to detect contextual factors that allow the computing device to sense or otherwise determine its environment. Then, based on the detected contextual factor(s), the application can display the items of sensitive content in obfuscated form or display the items of sensitive content to be readable or understandable (i.e., display non-obfuscated versions of the items of sensitive content). An item of sensitive content may be obfuscated, for example, by applying an overlay with sufficient distortion effects (e.g., a black-out box), applying a transformation, adding artifacts, redaction and/or minimizing or collapsing an application window displaying the item of sensitive content, that prevent viewing the item of sensitive content. In an implementation, the computing device may continually and/or periodically determine the contextual factor(s) (i.e., check its environment) and adjust the display of sensitive content accordingly.

The display of sensitive content, and the detection of the environment may be performed by the same application. As will become apparent from the description hereinbelow, the application may be executing on one or more devices. Additionally or alternatively, the display of the sensitive content may be performed by a first application and the detection of the environment may be performed by a second, different application and communicated to the first application.

In an example use case and embodiment, an application may be running on a user computing device (e.g., a desktop or mobile computing device) with a display (which may, for example, be a large display) in a space over which a user has control (for example, the user's office or any space over which a user may exercise or control access). The application may be displaying one or more items of sensitive content. As long as the computing device displaying the sensitive content does not detect the presence of another user (e.g., a user different than the user running the application) or another computing device (i.e., a computing device different than the computing device running the application) in the proximity of the display (e.g., in the user's space such as in the user's office), the application may display the items of sensitive content in a manner such that the sensitive content is readable or understandable. However, if the computing device detects another user or computing device in the proximity of the display (e.g., in the user office or other user space), the application may obfuscate or otherwise make unreadable or not understandable the displayed items of sensitive content.

In another example use case and embodiment, assume in the above example that the user running the application determines that the other user is permitted or authorized to view the display of the items of sensitive content. In this case, the user may activate a control element, such as a widget, to unobfuscate (or otherwise reveal or make readable or understandable) one, some, or all of the obfuscated items of sensitive content, thus causing the unobfuscated items of sensitive content to be readable or understandable. In an implementation, a user may be requested to provide authentication credentials, such as a single sign-on token, which may be used to authenticate the user requesting the unobfuscation of the obfuscated item or items of sensitive content. In this manner, a user without the necessary authentication credentials may be prevented from activating the control element to unobfuscate an obfuscated item of sensitive content since the authentication will fail.

In some embodiments, the control element may be implemented as a toggle such that, a first activation (or engagement or operation) of the control element may, for example, unobfuscate an obfuscated item of sensitive content and a second, subsequent activation of the control element may obfuscate an unobfuscated item of sensitive content. In other words, the control element toggles the obfuscation state of a displayed item or items of sensitive content. Such a control element may be useful, for example, in a situation in which a user working or otherwise interfacing with an application that is displaying an item of sensitive content decides to work on or otherwise interact with another application different than the application that is displaying the item of sensitive content. In this case, the user may decide to obfuscate the displayed item or items of sensitive content by activating (or otherwise operating or engaging) the control element (the control element implemented as a toggle) to obfuscate one, some, or all of the displayed items of sensitive content, thus causing the item or items of sensitive content to be displayed in obfuscated form or, in some cases, hidden from view. The user may later activate the control element to unobfuscate one, some, or all of the obfuscated items of sensitive content being displayed.

In another example use case and embodiment, a user may be using a computing device having a multi-monitor setup, where a first monitor is displaying a first application window of a first application and a second monitor is displaying a second application window of a second application. The first application window of the first application may be displaying sensitive content. The computing device may be programmed or otherwise configured to detect inactivity of the application windows. For example, in an implementation, the application windows may have respective inactivity timers. Then, if the user does not interact with the first application window of the first application for a duration of time, the inactivity timer for the first application window may timeout, causing the sensitive content displayed within the first application window to be in obfuscated form. The user may later start interacting with the first application window of the first application causing the inactivity timer for the first application window to be reset. The reset of the inactivity timer may cause the display of the obfuscated sensitive content within the application window to be readable or understandable. In an implementation, the user may be requested to provide authentication credentials when the user starts interacting with the first application window of the first application. The provided authentication credentials can then be authenticated before the obfuscated sensitive content is unobfuscated. Numerous other example scenarios and use cases will be apparent in light of this disclosure.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the concepts described herein in a standalone and/or networked environment. Various network node devices 103, 105, 107, and 109 may be interconnected via a wide area network (WAN) 101, such as the Internet. Other networks may also or alternatively be used, including private intranets, corporate networks, local area networks (LAN), metropolitan networks (MAN), wireless networks, personal networks (PAN), and the like. Network 101 is for illustration purposes and may be replaced with fewer or additional computer networks. A local area network 133 may have one or more of any known LAN topologies and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components and devices which make up the system of FIG. 1 may include a data server 103, a web server 105, and client computers 107, 109. Data server 103 provides overall access, control and administration of databases and control software for performing one or more illustrative aspects of the concepts described herein. Data server 103 may be connected to web server 105 through which users interact with and obtain data as requested. Alternatively, data server 103 may act as a web server itself and be directly connected to the Internet. Data server 103 may be connected to web server 105 through local area network 133, wide area network 101 (e.g., the Internet), via direct or indirect connection, or via some other network. Users may interact with data server 103 using remote computers 107, 109, e.g., using a web browser to connect to data server 103 via one or more externally exposed web sites hosted by web server 105. Client computers 107, 109 may be used in concert with data server 103 to access data stored therein or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used in the system architecture and data processing device of FIG. 1, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of data server 103. Data server 103 may further include a random access memory (RAM) 113, a read only memory (ROM) 115, a network interface 117, input/output interfaces 119 (e.g., keyboard, mouse, display, printer, etc.), and a memory 121. Input/output (I/O) interfaces 119 may include a variety of interface units and drives for reading, writing, displaying, and/or printing data or files. Memory 121 may store operating system software 123 for controlling overall operation of the data server 103, control logic 125 for instructing data server 103 to perform aspects of the concepts described herein, and other application software 127 providing secondary, support, and/or other functionality which may or might not be used in conjunction with aspects of the concepts described herein. Control logic 125 may also be referred to herein as the data server software. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the concepts described herein. Memory 121 may include, for example, a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to data server 103. Those of skill in the art will appreciate that the functionality of data server 103 (or device 105, 107, or 109) as described herein may be spread across multiple data processing devices, for example, to distribute processing load across multiple computers, to segregate transactions based on geographic location, user access level, quality of service (QoS), etc.

One or more aspects of the concepts described here may be embodied as computer-usable or readable data and/or as computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) Hypertext Markup Language (HTML) or Extensible Markup Language (XML). The computer executable instructions may be stored on a computer readable storage medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source node and a destination node (e.g., the source node can be a storage or processing node having information stored therein which information can be transferred to another node referred to as a "destination node"). The media can be transferred in the form of electromagnetic waves traveling through signal-conducting media such as metal wires, optical fibers, and/or wireless transmission media (e.g., air and/or space). Various aspects of the concepts described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects of the concepts described herein, and such data structures are contemplated within the scope of computer executable instructions and computer-usable data described herein.

Figure 2:
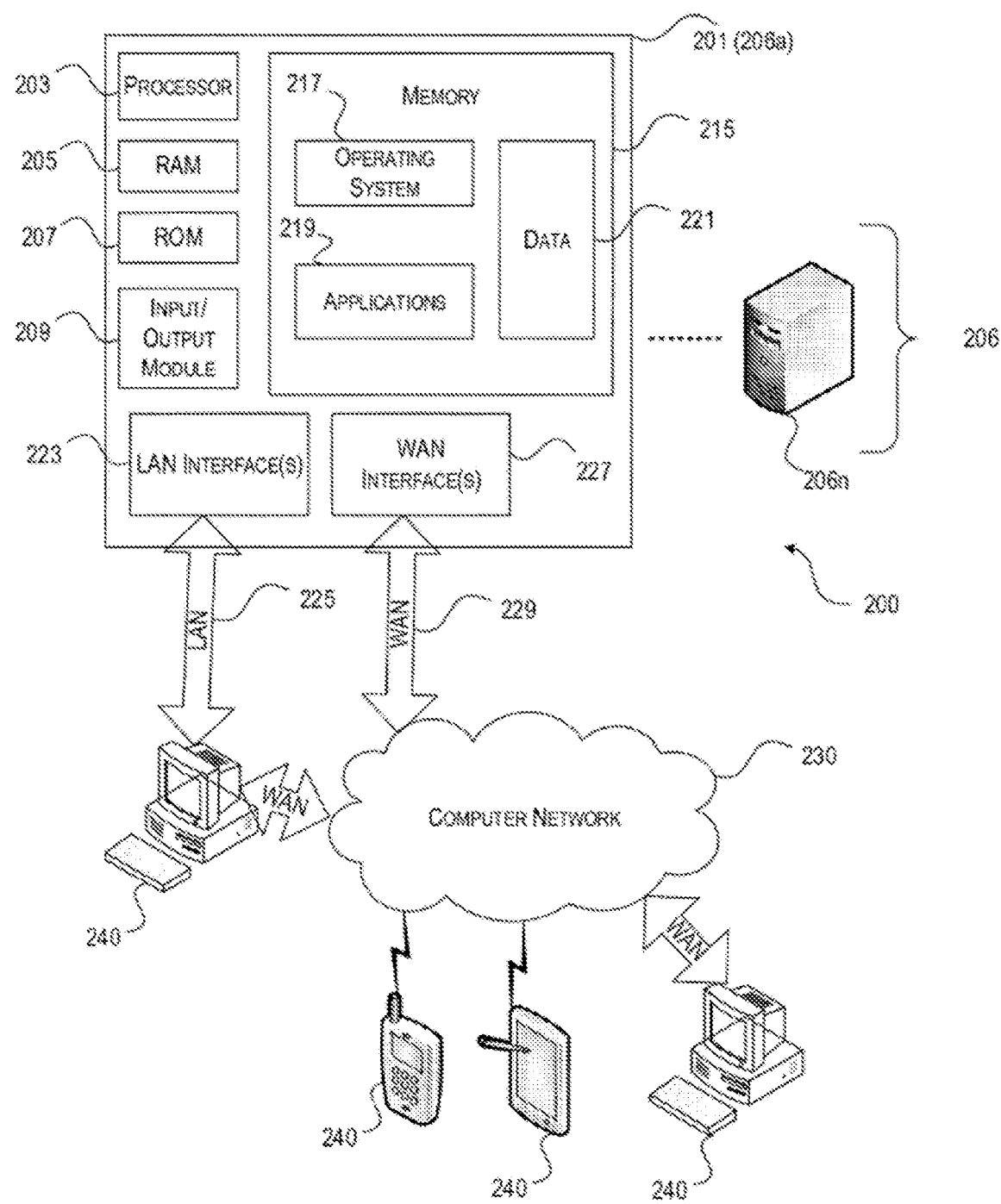
FIG. 2 depicts an illustrative remote-access system architecture that may be used in accordance with one or more illustrative aspects of the concepts described herein.

With further reference to FIG. 2, one or more aspects of the concepts described herein may be implemented in a remote-access environment. FIG. 2 depicts an example system architecture including a computing device 201 in an illustrative computing environment 200 that may be used according to one or more illustrative aspects of the concepts described herein. Computing device 201 may be used as a server 206a in a single-server or multi-server desktop virtualization system (e.g., a remote access or cloud system) configured to provide virtual machines (VMs) for client access devices. Computing device 201 may have a processor 203 for controlling overall operation of the server and its associated components, including a RAM 205, a ROM 207, an input/output (I/O) module 209, and a memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). Terminals 240 may be personal computers, mobile devices, laptop computers, tablets, or servers that include many or all the elements described above with respect to data server 103 or computing device 201. The network connections depicted in FIG. 2 include a local area network (LAN) 225 and a wide area network (WAN) 229 but may also include other networks. When used in a LAN networking environment, computing device 201 may be connected to LAN 225 through an adapter or network interface 223. When used in a WAN networking environment, computing device 201 may include a modem or other wide area network interface 227 for establishing communications over WAN 229, such as to computer network 230 (e.g., the Internet). It will be appreciated that the network connections shown are illustrative and other means of establishing a communication link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects of the concepts described herein may also be operational with numerous other general purpose or special purpose computing system environments or configurations. Examples of other computing systems, environments, and/or configurations that may be suitable for use with aspects of the concepts described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more terminals 240 may be in communication with one or more servers 206a-206n (generally referred to herein as "server(s) 206"). In one embodiment, computing environment 200 may include a network appliance installed between server(s) 206 and terminals 240. The network appliance may manage client/server connections, and in some cases can load balance client connections amongst a plurality of back-end servers 206.

Terminals 240 may in some embodiments be referred to as a single computing device or a single group of client computing devices, while server(s) 206 may be referred to as a single server 206 or a group of servers 206. In one embodiment, a single terminal 240 communicates with more than one server 206, while in another embodiment a single server 206 communicates with more than one terminal 240. In yet another embodiment, a single terminal 240 communicates with a single server 206.

Terminal 240 can, in some embodiments, be referred to as any one of the following non-exhaustive terms: client machine(s); client(s); client computer(s); client device(s); client computing device(s); local machine; remote machine; client node(s); endpoint(s); or endpoint node(s). Server 206, in some embodiments, may be referred to as any one of the following non-exhaustive terms: server(s), local machine; remote machine; server farm(s), or host computing device(s).

In one embodiment, terminal 240 may be a VM. The VM may be any VM, while in some embodiments the VM may be any VM managed by a Type 1 or Type 2 hypervisor, for example, a hypervisor developed by Citrix Systems, IBM, VMware, or any other hypervisor. In some aspects, the VM may be managed by a hypervisor, while in other aspects the VM may be managed by a hypervisor executing on server 206 or a hypervisor executing on terminal 240.

Some embodiments include a terminal, such as terminal 240, that displays application output generated by an application remotely executing on a server, such as server 206, or other remotely located machine. In these embodiments, terminal 240 may execute a VM receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

Server 206, in some embodiments, uses a remote presentation protocol or other program to send data to a thin-client or remote-display application executing on the client to present display output generated by an application executing on server 206. The thin-client or remote-display protocol can be any one of the following non-exhaustive list of protocols: the Independent Computing Architecture (ICA) protocol developed by Citrix Systems, Inc. of Fort Lauderdale, Fla.; or the Remote Desktop Protocol (RDP) manufactured by Microsoft Corporation of Redmond, Wash.

A remote computing environment may include more than one server 206a-206n logically grouped together into a server farm 206, for example, in a cloud computing environment. Server farm 206 may include servers 206a-206n that are geographically dispersed while logically grouped together, or servers 206a-206n that are located proximate to each other while logically grouped together. Geographically dispersed servers 206a-206n within server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, server farm 206 may be administered as a single entity, while in other embodiments server farm 206 can include multiple server farms.

In some embodiments, server farm 206 may include servers that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server, a master application server, a server executing an active directory, or a server executing an application acceleration program that provides firewall functionality, application functionality, or load balancing functionality. Other server types may also be used.

Some embodiments include a first server 206a that receives requests from terminal 240, forwards the request to a second server 206b (not shown), and responds to the request generated by terminal 240 with a response from second server 206b (not shown). First server 206a may acquire an enumeration of applications available to terminal 240 as well as address information associated with an application server 206 hosting an application identified within the enumeration of applications. First server 206a can present a response to the client's request using a web interface and communicate directly with terminal 240 to provide terminal 240 with access to an identified application. One or more terminals 240 and/or one or more servers 206 may transmit data over network 230, e.g., network 101.

Figure 3:
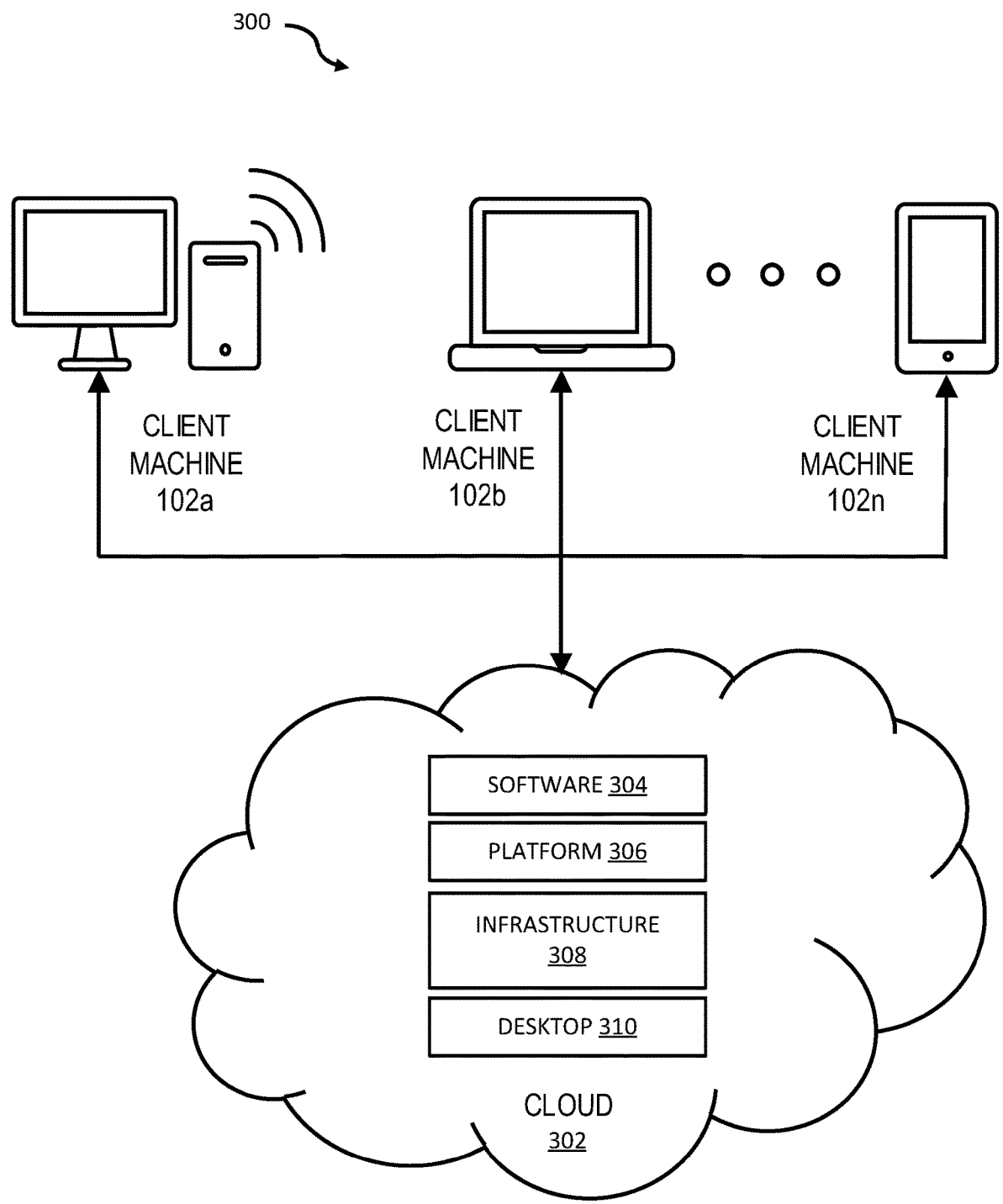
FIG. 3 is a block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 302. Cloud network 302 may include back-end platforms, e.g., servers, storage, server farms or data centers. The users or clients 102a-102n can correspond to a single organization/tenant or multiple organizations/tenants. More particularly, in one example implementation cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a Service (SaaS) 304, Platform as a Service (PaaS) 306, Infrastructure as a Service (IaaS) 308, and Desktop as a Service (DaaS) 310, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHT-SCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
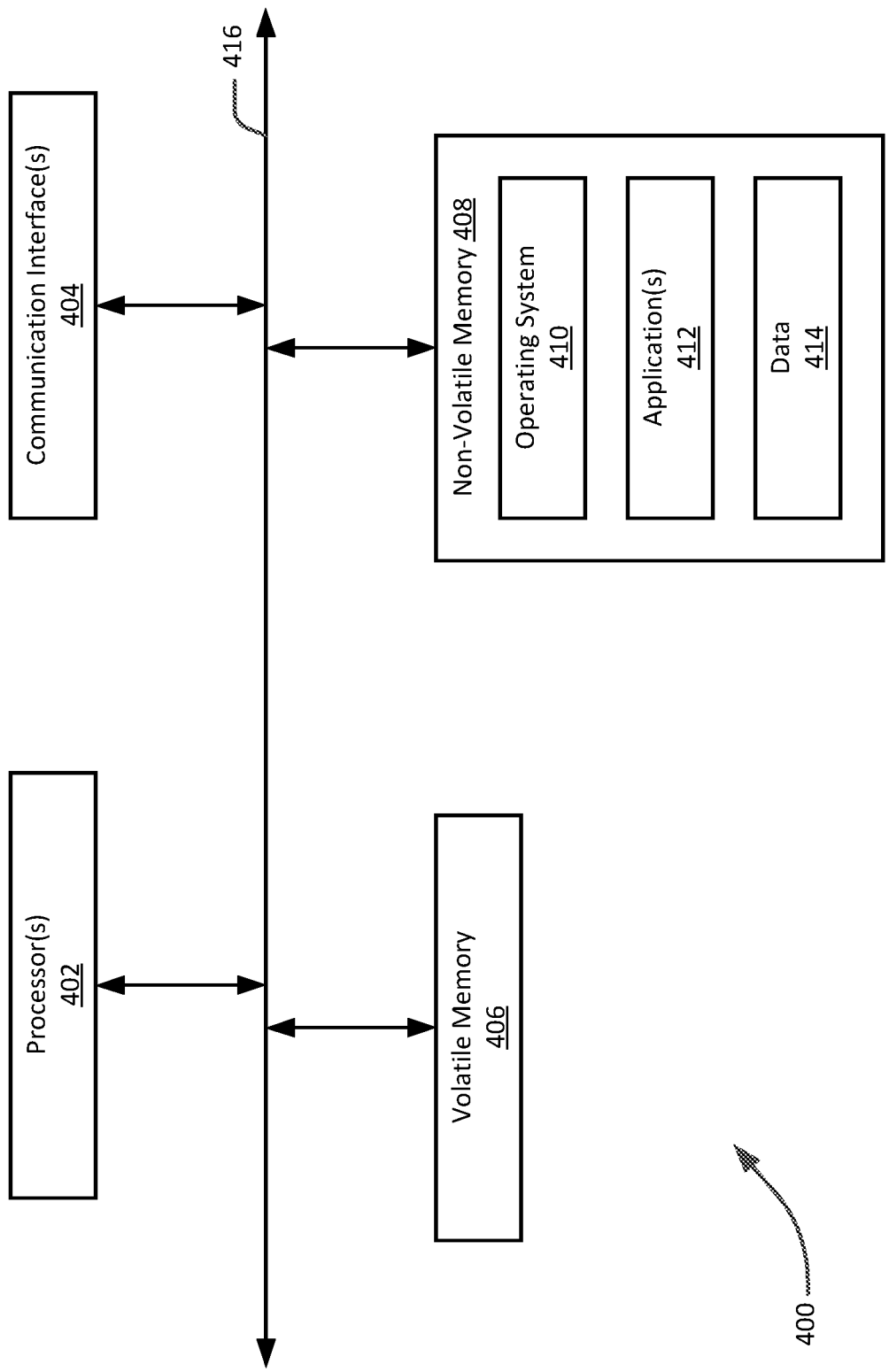
FIG. 4 is a block diagram illustrating selective components of an example computing device in which various aspects of the disclosure may be implemented, in accordance with an embodiment of the present disclosure.

FIG. 4 is a block diagram illustrating selective components of an example computing device 400 in which various aspects of the disclosure may be implemented, in accordance with an embodiment of the present disclosure. Computing device 400 is shown merely as an example of components 103, 105, 107, and 109 of FIG. 1, computing device 201 and terminals 240 of FIG. 2, and/or client machines 102a-102n of FIG. 3, for instance. However, the illustrated computing device 400 is shown merely as an example and one skilled in the art will appreciate that components 103, 105, 107, and 109 of FIG. 1, computing device 201 and terminals 240 of FIG. 2, and/or client machines 102a-102n of FIG. 3 may be implemented by any computing or processing environment and with any type of machine or set of machines that may have suitable hardware and/or software capable of operating as described herein.

As shown in FIG. 4, computing device 400 includes one or more processor(s) 402, one or more communication interface(s) 404, a volatile memory 406 (e.g., random access memory (RAM)), a non-volatile memory 408, and a communications bus 416.

Non-volatile memory 408 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

Non-volatile memory 408 stores an operating system 410, one or more applications 412, and data 414 such that, for example, computer instructions of operating system 410 and/or applications 412 are executed by processor(s) 402 out of volatile memory 406. For example, in some embodiments, applications 412 may cause computing device 400 to implement functionality in accordance with the various embodiments and/or examples described herein. In some embodiments, volatile memory 406 may include one or more types of RAM and/or a cache memory that may offer a faster response time than a main memory. Data may be entered using an input device of computing device 400 or received from I/O device(s) communicatively coupled to computing device 400. Various elements of computing device 400 may communicate via communications bus 416.

Processor(s) 402 may be implemented by one or more programmable processors to execute one or more executable instructions, such as applications 412 and/or a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, processor 402 can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 402 may be analog, digital or mixed signal. In some embodiments, processor 402 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communication interface(s) 404 may include one or more interfaces to enable computing device 400 to access a computer network such as a Local Area Network (LAN), a Wide Area Network (WAN), a Personal Area Network (PAN), or the Internet through a variety of wired and/or wireless connections, including cellular connections.

In described embodiments, computing device 400 may execute an application on behalf of a user of a client device. For example, computing device 400 may execute one or more virtual machines managed by a hypervisor. Each virtual machine may provide an execution session within which applications execute on behalf of a user or a client device, such as a hosted desktop session. Computing device 400 may also execute a terminal services session to provide a hosted desktop environment. Computing device 400 may provide access to a remote computing environment including one or more applications, one or more desktop applications, and one or more desktop sessions in which one or more applications may execute.

For example, in some embodiments, a first computing device 400 may execute an application on behalf of a user of a client computing device (e.g., client 107 or 109 of FIG. 1), may execute a VM, which provides an execution session within which applications execute on behalf of a user or a client computing device (e.g., any of client machines 102a-102n of FIG. 3), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 5:
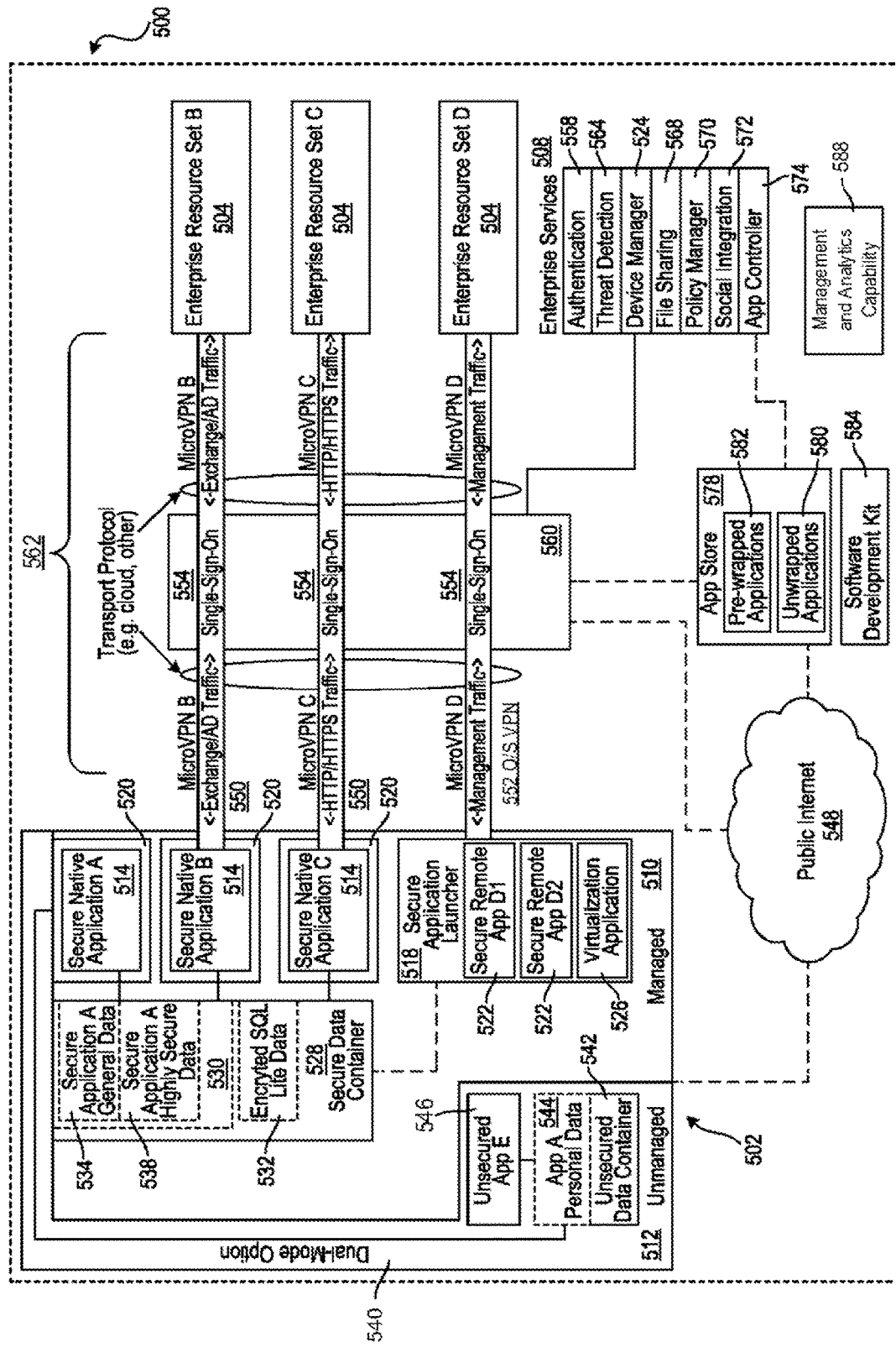
FIG. 5 is a block diagram of an illustrative enterprise mobility management system, in accordance with an embodiment of the present disclosure.

FIG. 5 depicts an illustrative enterprise mobility management system 500, in accordance with an embodiment of the present disclosure. For example, mobility management system 500 may be used in or to implement an enterprise mobile computing environment. In an example use case, mobility management system 500 enables a user of a mobile device 502 to both access enterprise or personal resources from mobile device 502 and use mobile device 502 for personal use. The user may access such enterprise resources 504 or enterprise services 508 using a mobile device 502 that is purchased by the user or a mobile device 502 that is provided by the enterprise to the user. The user may utilize mobile device 502 for business use only or for business and personal use. Mobile device 502 may run an iOS operating system, an Android operating system, or the like. The enterprise may choose to implement policies to manage mobile device 502. The policies may be implemented through a firewall or gateway in such a way that mobile device 502 may be identified, secured, or security verified, and provided selective or full access to the enterprise resources (e.g., 504 and 508). The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of mobile device 502 may be separated into a managed partition 510 and an unmanaged partition 512. Managed partition 510 may have policies applied to it to secure the applications running on and data stored in managed partition 510. The applications running on managed partition 510 may be secure applications. In other embodiments, these applications may execute in accordance with a set of one or more policy files received separate from the application, and which define one or more security parameters, features, resource restrictions, and/or other access controls that are enforced by the mobile device management system when that application is executing on mobile device 502.

By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. Secure native applications 514 may be wrapped by a secure application wrapper 520.

Secure application wrapper 520 may include integrated policies that are executed on mobile device 502 when secure native application 514 is executed on mobile device 502. Secure application wrapper 520 may include metadata that points secure native application 514 running on mobile device 502 to the resources hosted at the enterprise (e.g., 504 and 508) that secure native application 514 may require to complete the task requested upon execution of secure native application 514. Secure remote applications 522 executed by a secure application launcher 518 may be executed within secure application launcher 518. Virtualization applications 526 executed by secure application launcher 518 may utilize resources on mobile device 502, at enterprise resources 504, and the like.

The resources used on mobile device 502 by virtualization applications 526 executed by secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from enterprise resources 504, and the like. The resources used at enterprise resources 504 by virtualization applications 526 executed by secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like.

For example, virtualization application 526 may record user interactions associated with a graphical user interface (GUI) and communicate them to a server application where the server application uses the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on mobile device 502, this arrangement may also be elected for certain applications.

For example, while some applications may be secured for use on mobile device 502, others might not be prepared or appropriate for deployment on mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data.

An enterprise may elect to provide both fully secured and fully functional applications on mobile device 502 as well as virtualization application 526 to allow access to applications that are deemed more properly operated on the server side. In an embodiment, virtualization application 526 may store some data, files, etc. on mobile device 502 in one of the secure storage locations. An enterprise, for example, may elect to allow certain information to be stored on mobile device 502 while not permitting other information.

In connection with virtualization application 526, as described herein, mobile device 502 may have virtualization application 526 that is designed to present GUIs and then record user interactions with the GUI. Virtualization application 526 may communicate the user interactions to the server side to be used by the server side application as user interactions with the application. In response, the application on the server side may transmit back to mobile device 502 a new GUI. For example, the new GUI may be a static page, a dynamic page, an animation, or the like, thereby providing access to remotely located resources.

Secure applications 514 may access data stored in a secure data container 528 in managed partition 510 of mobile device 502. The data secured in the secure data container may be accessed by secure native applications 514, secure remote applications 522 executed by secure application launcher 518, virtualization applications 526 executed by secure application launcher 518, and the like. The data stored in secure data container 528 may include files, databases, and the like. The data stored in secure data container 528 may include data restricted to a specific secure application 530, shared among secure applications 532, and the like.

Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in secure data container 528 may be deleted from mobile device 502 upon receipt of a command from device manager 524. The secure applications (e.g., 514, 522, and 526) may have a dual-mode option 540.

Dual mode option 540 may present the user with an option to operate the secured application in an unsecured or unmanaged mode. In an unsecured or unmanaged mode, the secure applications may access data stored in an unsecured data container 542 on unmanaged partition 512 of mobile device 502. The data stored in an unsecured data container may be personal data 544. The data stored in unsecured data container 542 may also be accessed by unsecured applications 546 that are running on unmanaged partition 512 of mobile device 502. The data stored in unsecured data container 542 may remain on mobile device 502 when the data stored in secure data container 528 is deleted from mobile device 502.

An enterprise may want to delete from mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

Mobile device 502 may connect to enterprise resources 504 and enterprise services 508 at an enterprise, to public Internet 548, and the like. Mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of mobile device 502 may access enterprise resources through an application specific VPN such that access to the VPN would be granted based on attributes associated with the application, possibly in conjunction with user or device attribute information.

The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. Authentication service 558 may then grant to the user access to multiple enterprise resources 504, without requiring the user to provide authentication credentials to each individual enterprise resource 504.

The virtual private network connections may be established and managed by an access gateway 560. Access gateway 560 may include performance enhancement features that manage, accelerate, and improve the delivery of enterprise resources 504 to mobile device 502. Access gateway 560 may also re-route traffic from mobile device 502 to public Internet 548, enabling mobile device 502 to access publicly available and unsecured applications that run on public Internet 548. Mobile device 502 may connect to the access gateway via a transport network 562. Transport network 562 may use one or more transport protocols and may be a wired network, wireless network, cloud network, local area network, metropolitan area network, wide area network, public network, private network, and the like.

Enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. Enterprise resources 504 may be premise-based resources, cloud-based resources, and the like. Enterprise resources 504 may be accessed by mobile device 502 directly or through access gateway 560. Enterprise resources 504 may be accessed by mobile device 502 via transport network 562.

Enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on mobile device 502, by enterprise resources 504, and the like. The certificates stored on mobile device 502 may be stored in an encrypted location on mobile device 502, the certificate may be temporarily stored on mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

Mobility management system 500 may include an application store 578. Application store 578 may include unwrapped applications 580, pre-wrapped applications 582, and the like. Applications may be populated in application store 578 from application controller 574. Application store 578 may be accessed by mobile device 502 through access gateway 560, through public Internet 548, or the like. Application store 578 may be provided with an intuitive and easy to use user interface.

A software development kit 584 may provide a user the capability to secure applications selected by the user by wrapping the application as described previously in this description. An application that has been wrapped using software development kit 584 may then be made available to mobile device 502 by populating it in application store 578 using application controller 574.

Mobility management system 500 may include a management and analytics capability 588. Management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
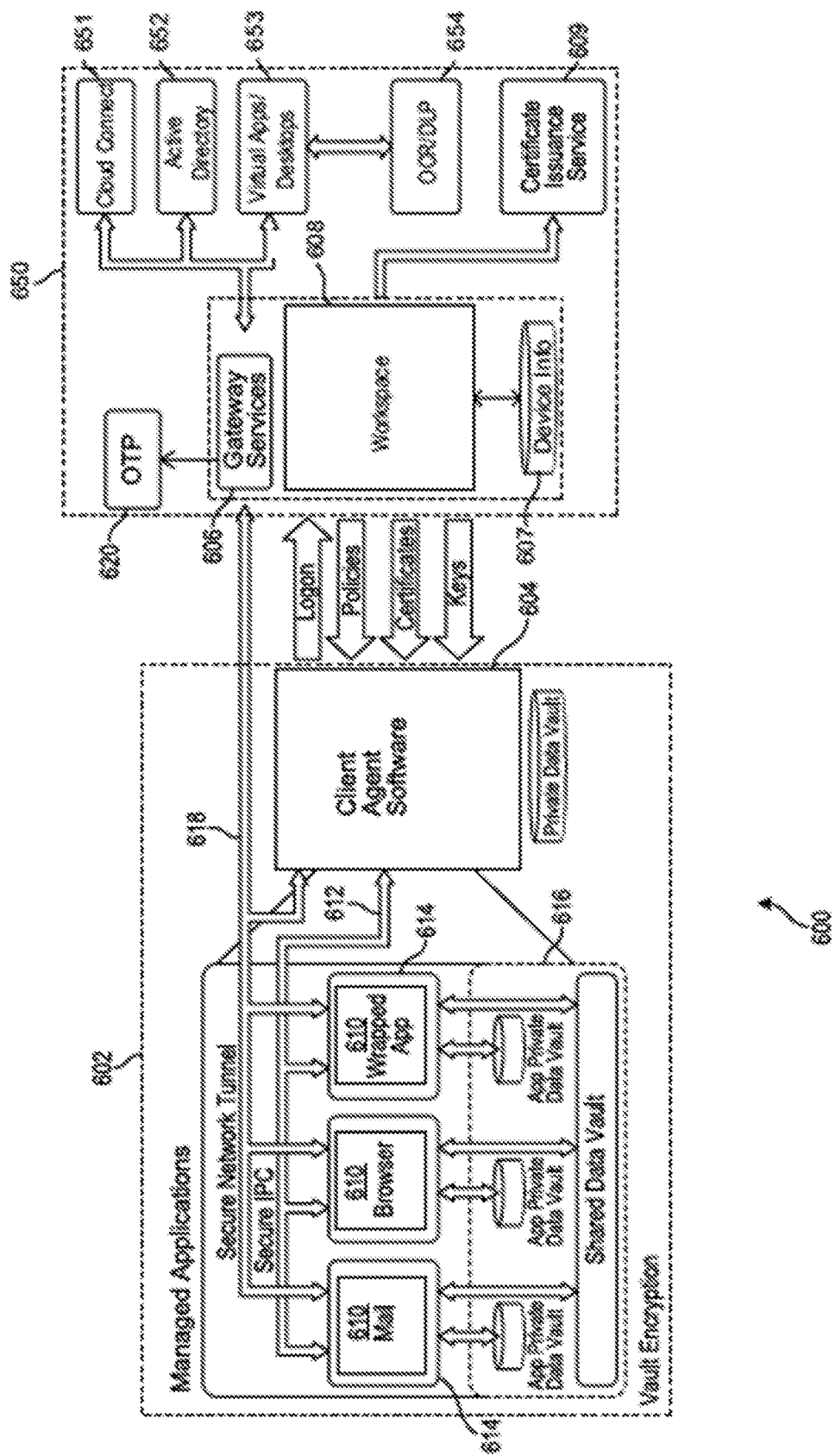
FIG. 6 is a block diagram of an illustrative enterprise computing device management system, in accordance with an embodiment of the present disclosure.

FIG. 6 depicts an illustrative enterprise computing device management system 600, in accordance with an embodiment of the present disclosure. For example, computing device management system 600 may be used in or to implement an enterprise computing environment. Some of the components of mobility management system 500 described above with reference to FIG. 5 have been omitted for the sake of simplicity. The architecture of system 600 depicted in FIG. 6 is similar in many respects to the architecture of mobility management system 500 described above with reference to FIG. 5 and may include additional features not mentioned above.

As can be seen, the left side of FIG. 6 represents an enrolled computing device 602 with a client agent 604, which interacts with a gateway server 606 (which includes Access Gateway and application controller functionality) to access various virtual apps/desktops 653 and other resources, such as an active directory (AD) 652 resource, as shown on the right side of FIG. 6. Computing device 602 may be a mobile computing device, such as mobile device 502, or a stationary (e.g., non-mobile) computing device. Examples of mobile computing devices include a smartphone, tablet, laptop computer, notebook computer, smart watch, and personal digital assistant (PDA), to name a few examples. Examples of stationary computing devices include a desktop computer, workstation, and a smart TV, to name several examples. The services and components on the right side of FIG. 6 may collectively be referred to as a sensitive content management system 650, the functions of which are described in more detail below.

Client agent 604 may act as the UI (user interface) intermediary for virtual apps/desktops 653 hosted by sensitive content management system 650, which may be accessed using the High-Definition User Experience (HDX)/ICA display remoting protocol. Client agent 604 may also support the installation and management of native applications on computing device 602, such as native WINDOWS, macOS, iOS, or ANDROID applications. For example, managed applications 610 (mail, browser, wrapped application) shown in FIG. 6 may be native applications that execute locally on computing device 602. Client agent 604 and application management framework of this architecture may act to provide policy driven management capabilities and features such as connectivity and single sign-on (SSO) to enterprise resources/services (e.g., virtual apps/desktops 653, active directory 652). Client agent 604 may handle primary user authentication to the enterprise, normally to Access Gateway (AG) 606 with SSO to other gateway server components. Client agent 604 may obtain policies from gateway server 606 to control the behavior of managed applications 610 on computing device 602.

Secure InterProcess Communication (IPC) links 612 between native applications 610 and client agent 604 represent a management channel, which may allow a client agent to supply policies to be enforced by an application management framework 614 "wrapping" each application. IPC channel 612 may also allow client agent 604 to supply credential and authentication information that enables connectivity and SSO to enterprise resources (e.g., virtual apps/desktops 653, active directory 652). In addition, IPC channel 612 may allow application management framework 614 to invoke user interface functions implemented by client agent 604, such as online and offline authentication.

Communications between client agent 604 and gateway server 606 may be essentially an extension of the management channel from application management framework 614 wrapping each native managed application 610. Application management framework 614 may request policy information from client agent 604, which in turn may request it from gateway server 606. Application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for local data vaults 616 or may provide client certificates which may enable direct authentication to PKI protected resources, as more fully explained below.

In more detail, application management framework 614 "wraps" each managed application 610. This may be incorporated via an explicit build operation or step, or via a post-build processing operation or step. Application management framework 614 may "pair" with client agent 604 on first launch of an application 610 to initialize secure IPC channel 612 and obtain the policy for that application. Application management framework 614 may enforce relevant portions of the policy that apply locally, such as the client agent login dependencies and some of the containment policies that restrict how local OS services may be used, or how they may interact with managed application 610.

Application management framework 614 may use services provided by client agent 604 over secure IPC channel 612 to facilitate authentication and internal network access. Key management for the private and shared data vaults 616 (containers) may be also managed by appropriate interactions between managed applications 610 and client agent 604. Vaults 616 may be available only after online authentication or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. Application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

Mail and Browser managed applications 610 may have special status and may make use of facilities that might not be generally available to arbitrary wrapped applications. For example, Mail application 610 may use a special background network access mechanism that allows it to access an exchange server (not shown) over an extended period of time without requiring a full AG logon. Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of data vaults 616 (containers) on computing device 602. Vaults 616 may be encrypted so that all on-device data including files, databases, and configurations are protected. For on-line vaults, the keys may be stored on a server (e.g., gateway server 606), and for off-line vaults, a local copy of the keys may be protected by a user password or biometric validation. If or when data is stored locally on computing device 602 in secure container 616, a minimum of AES 256 encryption algorithm may be utilized, although other suitable encryption algorithms may be used.

Other secure container features may also be implemented. For example, a logging feature may be included, wherein security events happening inside managed application 610 may be logged and reported to the backend. Data wiping may be supported, such as if or when managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on computing device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector can cause multiple copies of the same encrypted data to yield different cipher text output, preventing both replay and cryptanalytic attacks. This can also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of AD 652 password for access to one or more applications. In some cases, some users do not know (or are not permitted to know) their AD password, so these users may authenticate using OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, managed application 610 may utilize such a certificate. In this case, certificate-based authentication using ActiveSync protocol may be supported, wherein a certificate from client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

Client agent 604 and application management framework 614 may be enhanced to support obtaining and using client certificates for authentication to internal PKI protected network resources. More than one certificate may be supported, such as to match various levels of security and/or separation requirements. The certificates may be used by Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that computing device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g., transaction log) or for temporary data encryption.

As will be described in more detail below in conjunction with FIGS. 7-11, and in accordance with embodiments disclosed herein, contextual factors may be used, in part, to make determinations related to obfuscation and unobfuscation of sensitive content in the display of the sensitive content. For example, an enterprise may implement context-aware obfuscation and unobfuscation of sensitive content to secure the sensitive content against data loss and/or leakage resulting from displaying of the sensitive content. In order to manage the security of sensitive content, the enterprise may deploy various components and functionalities of mobility management system 500 of FIG. 5 and/or enterprise computing device management system 600 of FIG. 6. In particular, sensitive content management system 650 may be aware of computing devices used by or otherwise associated with users (e.g., individuals) associated with the enterprise, such as employees or persons authorized to access the enterprise resources, for example. The computing device may be a computing device provided by an organization (such as the enterprise) employing a user or some other entity in a business relationship with the user, a personal computing device owned by or otherwise associated with the user, or any other device on which the user may have access to potentially sensitive content (e.g., a public device on which the user can access a corporate network, for example).

Figure 7:
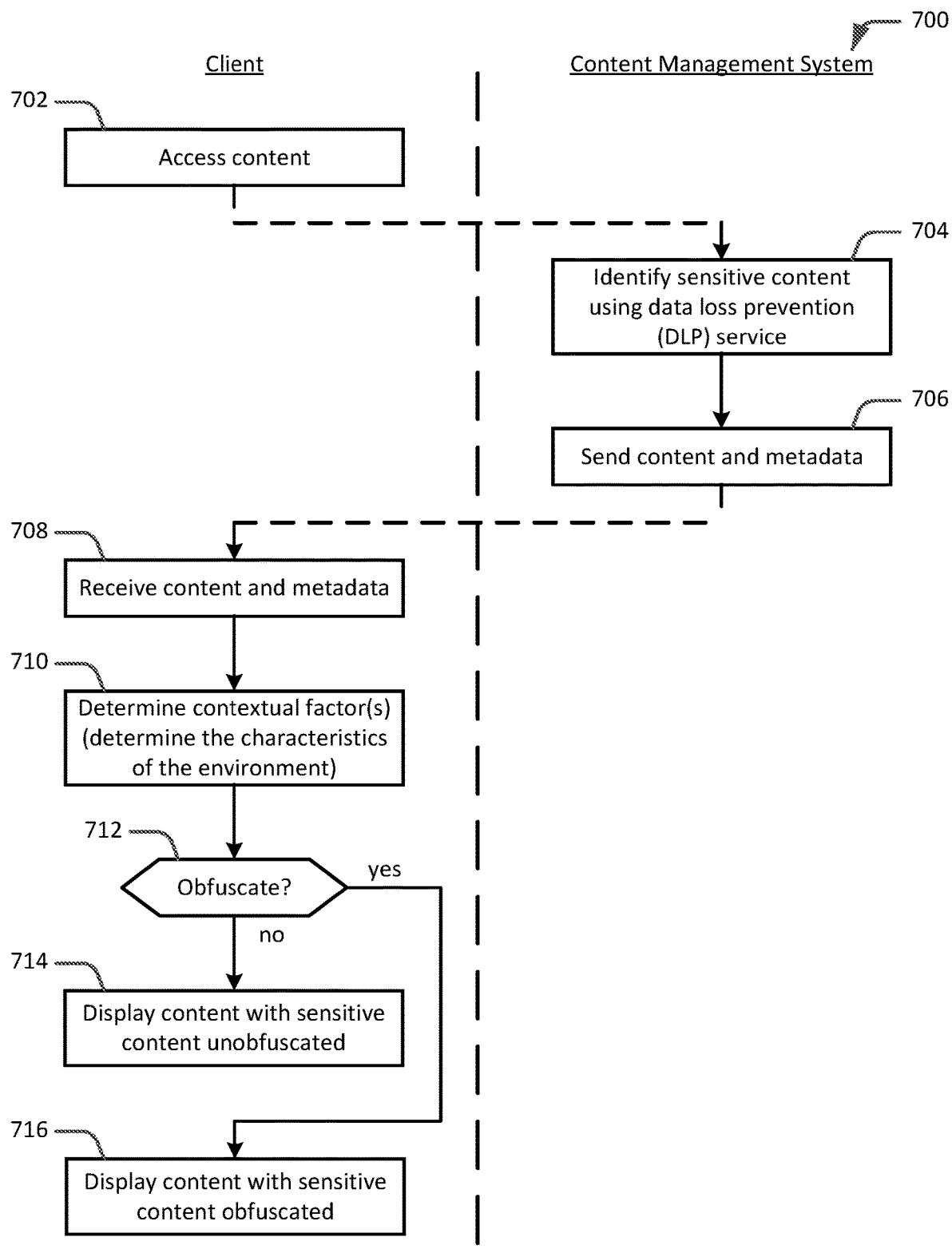
FIG. 7 is a flow diagram of an example process for context-aware obfuscation of sensitive content, in accordance with an embodiment of the present disclosure.

FIG. 7 is a flow diagram of an example process 700 for context-aware obfuscation of sensitive content, in accordance with an embodiment of the present disclosure. Example process 700, and example processes 800, 900, and 1000 further described below, may be implemented or used within a computing environment such as those disclosed above at least with respect to FIG. 5 and/or FIG. 6. Further, in some embodiments, the operations, functions, or actions illustrated in example process 700, and example processes 800, 900, and 1000 further described below, may be stored as computer-executable instructions in a computer-readable medium, such as volatile memory 406 and/or non-volatile memory 408 of computing device 400 of FIG. 4 (e.g., computer-readable medium of components 103, 105, 107, and 109 of FIG. 1, computing device 201 and terminals 240 of FIG. 2, and/or client machines 102a-102n of FIG. 3). For example, the operations, functions, or actions described in the respective blocks of example process 700, and example processes 800, 900, and 1000 further described below, may be implemented by applications 412 and/or data 414 of computing device 400.

With reference to example process 700 of FIG. 7, at 702, a user may use a computing device, such as computing device 602, to access content. For example, the user may access the content using a client agent, such as client agent 604, running on the user's computing device.

In response to the access for content, at 704, gateway server 606 may utilize an optical character recognition/data loss prevention (OCR/DLP) service 654 of sensitive content management system 650 to determine whether the content to be delivered to the user (e.g., the content the user wants to access) contains any items of sensitive content (sensitive information). In an implementation, a Software-as-a-Service (SaaS) application may utilize OCR/DLP service 654 to determine whether the content to be delivered to the user contains any items of sensitive content. In any case, the content may be in a text-based format (e.g., textual data) or an image-based format (e.g., an image of the content). In the case of an image, OCR/DLP service 654 may use optical character recognition (OCR) to convert the image of the content to textual data. It will be appreciated that other methods/techniques of text extraction may also be used (e.g., textual data may be embedded in the content and extracted). In any case, OCR/DLP service 654 may scan the content to identify items of sensitive content contained in the content.

For example, in an implementation, OCR/DLP service 654 may scan the textual data for certain keywords or phrases, and/or search the textual data using regular expressions, for patterns of characters to identify items of sensitive content contained in the content being accessed by the user. Non-limiting examples of sensitive content include any data that could potentially be used to identify a particular individual (e.g., a full name, Social Security number, driver's license number, bank account number, passport number, and email address), financial information regarding an individual/organization, and information deemed confidential by the individual/organization (e.g., contracts, sales quotes, customer contact information, phone numbers, personal information about employees, and employee compensation information). Other pattern recognition techniques may be used to identify items of sensitive content.

OCR/DLP service 654 may determine the location of any identified item of sensitive content within the content. For example, in the case of textual content, an OCR process and/or a text extraction process of OCR/DLP service 654 may tag recognized words or characters in the content with location data indicating absolute or relative (e.g., with respect to other display elements) display position data, such as coordinates. Then, for identified items of sensitive content, OCR/DLP service 654 can provide a starting and ending character location which contains the item of sensitive content. In the case of an image, for identified items of sensitive content, OCR/DLP service 654 can provide a location of a bounding rectangle (e.g., coordinates of the four corners of the bounding rectangle) that delineates or defines the bounds (e.g., boundary) of the identified item of sensitive content.

Having processed the requested content (the content to be delivered to the user) for any items of sensitive content, OCR/DLP service 654 may deliver the content to the user's computing device. If the content contains items of sensitive content, at 706, OCR/DLP service 654 may deliver the content and associated metadata. The metadata may be included in a data structure. The metadata may provide information regarding the identified items of sensitive content.

In an implementation, OCR/DLP service 654 may deliver the content in its original form in which the items of sensitive content are not modified (e.g., not obfuscated). In such cases, the metadata may provide the location details (e.g., bounding rectangles, position details, etc.) for the identified items of sensitive content contained in the content. For example, if the content contains a bank account number, the metadata may provide information regarding the location of the bank account number and/or a bounding rectangle sufficient to enclose the bank account number. The location details (e.g., the location of the bank account number) can then be used to apply obfuscation to the items of sensitive content (e.g., obfuscate the bank account number) contained in the content.

In another implementation, OCR/DLP service 654 may deliver the content in a modified form in which the items of sensitive content are obfuscated (items of sensitive content are in obfuscated form) within the content. In such cases, the metadata may provide the location details that indicate where the obfuscation is applied within the content and the original content portions for the obfuscated items of sensitive content. For example, if a social security number contained in the content is obfuscated, the metadata may provide information regarding the location of the obfuscation of the social security number within the content and the social security number. The location details (e.g., location of the obfuscated social security number) and the original content portion (e.g., social security number) can then be used to unobfuscate the obfuscated item of sensitive content (e.g., unobfuscate the social security number) contained in the content. In an embodiment, the metadata may be encrypted and sent via a secure connection, such as SSL/TLS, to the user's computing device.

If the content does not contain any sensitive content, OCR/DLP service 654 may deliver the content in its original form with an indication that the content does not contain any sensitive content.

At 708, the user's computing device may receive the accessed content. If the received content includes an indication that the content does not contain any sensitive content, the user's computing device may cause the content to be displayed without any modification. For example, the content may be displayed within an application window on a display (e.g., monitor) communicatively coupled to the user's computing device. An example of a public document (i.e., a document that does not contain any sensitive content) may be a document downloaded from a publicly accessible internet site may since the document is publicly available. Another example of a document that is not sensitive may be a company holiday list.

If the received content contains one or more items of sensitive content (as indicated by the included metadata), then, at 710, the user's computing device may determine contextual factors that may be used to decide whether to display the items of sensitive content as obfuscated (in obfuscated form) or unobfuscated (to be readable or understandable). In general, the contextual factors provide an indication of the vulnerability of the items of sensitive content to potential data loss or leakage when the items of sensitive content are displayed. To this end, the user's computing device may monitor and/or detect contextual factors indicative or reflective of the environment in which the items of sensitive content is being (or will be) displayed.

For instance, sensitive content, when displayed, may be vulnerable to data loss when another user (i.e., a user other than the user authorized to access the content that contains the sensitive content) is in physical proximity to the media (e.g., a computer or other display) on which sensitive content is being displayed. In some embodiments, a virtual boundary (e.g., a "geofencing boundary") may be configured or otherwise established for the user's computing device. The boundary may define a physical region or zone (i.e., a security zone) around the user's computing device. The user's computing device may be able to detect electronic devices within the boundary (i.e., within the security zone). For example, in an implementation, the geofencing boundary may be configured around the user's computing device using a location-based service enabled application or software. Such location-based service enabled applications may use Global Positioning System (GPS), radio frequency identification (RFID), Wi-Fi, or cellular data to trigger a programmed action when a mobile device or RFID tag enters or exits the geofencing boundary set up around the user's computing device.

For example, when another user having or otherwise in possession of an enrolled device, such as an enrolled mobile device 502, enters the boundary, the enrolled device of the other user may generate an alert or other notification. This alert may be transmitted to the user's computing device. Additionally or alternatively, this alert may be transmitted to another device, such as enterprise mobility management system 500, configured or designated to receive the alert. In any case, the generated alert allows for detection of the other user within the physical proximity to the user's computing device. For purposes of this discussion, it is sufficient to understand that a device's location can be used to determine whether that device is within physical proximity of another device on which sensitive content is being displayed based on the defined boundary.

In some embodiments, a beacon, such as a Bluetooth beacon or a Bluetooth Low Energy beacon, may be used to configure or otherwise establish a security zone around the user's computing device. The user's computing device may then be able to detect electronic devices that are within the established security zone (i.e., detect electronic devices that are sufficiently proximate to the user's computing device). For example, when another user having or otherwise in possession of an enrolled device, such as an enrolled mobile device 502, comes within range of the beacon's signal transmissions, the enrolled device of the other user may be able to determine from the strength of the signal transmissions that the device is within the security zone. The enrolled device of the other user may then provide a notification of its presence within the security zone to the user's computing device. Based on the received notification, the user's computing device may determine that the other user is within physical proximity.

In some embodiments, the user's computing device may include an image capture device, such as a webcam. The user's computing device can then detect the presence of other users in the physical proximity of the computing device from the image or video data provided by the image capture device. For example, in an implementation, the image capture device may be configured to capture images or videos when sensitive content is being displayed on the user's computing device. Such detection may be useful in cases where other users are not carrying or otherwise have in their possession enrolled mobile devices, such as an enrolled mobile device 502.

In some embodiments, image capture devices, such as webcams and surveillance cameras, may be deployed around the user's computing device. The deployed image capture devices may be communicatively coupled to the user's computing device, thus allowing the user's computing device to detect the presence of other users in the physical proximity of the computing device from the images or videos captured by the image capture devices. Again, such detection may be useful in cases where other users are not carrying or otherwise have in their possession enrolled mobile devices, such as an enrolled mobile device 502.

In some instances, sensitive content, when displayed, may be vulnerable to data loss when the user who is accessing the content that contains the sensitive content is not interacting with the sensitive content. For example, the sensitive content may be being displayed within an application window associated with an application, such as a managed application previously described at least in conjunction with FIG. 6, used by the user to access the content. The user's computing device may be programmed or otherwise configured to detect inactivity of the application window displaying the sensitive content. For example, in an implementation, the application window may be configured with an inactivity timer. The application window inactivity timer may be configured or otherwise set to a suitable value, such as 30 seconds (sec), 45 sec, 60 sec, 90 sec, 120 sec, 240 sec, or any other desired duration of time. In operation, the inactivity timer for an application window may be initiated when the user stops interacting with the application window. A timeout of the inactivity timer (the inactivity timer reaching its preconfigured value) may be an indication that the user is not interacting with the sensitive content, and that the displayed items of sensitive content should be obfuscated (displayed in obfuscated form) to prevent potential data loss. In an implementation, the inactivity timer for the application window may be reset when the user again starts interacting with the application window displaying the obfuscated items of sensitive content. The reset of the inactivity timer may cause the display of the obfuscated items of sensitive content to be in readable form (i.e., unobfuscated). In an implementation, the user may be requested to provide authentication credentials for authentication of the user when the user again starts to interact with the application window displaying the obfuscated items of sensitive content. The provided authentication credentials can then be authenticated before the obfuscated sensitive content is unobfuscated.

Still referring to process 800, upon determining the contextual factor(s), at 712, the user's computing device may determine whether to obfuscate the identified items of sensitive content, for example, when displaying the content that contains the items of sensitive content. In an embodiment, the items of sensitive content may be displayed in obfuscated form upon detecting contextual factors that indicate that another user is in the physical proximity of the display of the sensitive content. Conversely, if no other users other than the user accessing the content is in the physical proximity of the display, the items of sensitive content may be displayed in readable or understandable form. In an embodiment, the items of sensitive content may be displayed in obfuscated form if the contextual factors indicate that the application window that is displaying the items of sensitive content has been inactive for a sufficient duration of time. In such embodiments, the items of sensitive content within the application window may be displayed in readable or understandable form once the application window again becomes active (e.g., the user again starts to interact with the application window).

If the user's computing device determines to not obfuscate the identified items of sensitive content, then, at 714, the user's computing device may cause the content, including the identified items of sensitive content, to be displayed without any modification. For example, the content, including the identified items of sensitive content, may be displayed within an application window on a display communicatively coupled to the user's computing device. In cases where the content is received in modified form (i.e., the received content contains the items of sensitive content in obfuscated form), the user's computing device may use the information provided by the metadata (e.g., location(s) where obfuscation has been applied, original sensitive content portions, etc.) to unobfuscate the obfuscated items of sensitive content. In an implementation, the user's computing device may provide a control element, such as a toggle control, that allows a user to obfuscate the displayed items of sensitive content. The provided control element may allow the user to obfuscate and unobfuscate the displayed items of sensitive content. In some implementations, the user's computing device may provide such a control element for each item of sensitive content being displayed.

If the user's computing device determines to obfuscate the identified items of sensitive content, then, at 716, the user's computing device may cause the content, including the identified items of sensitive content, to be displayed in obfuscated form. For example, the content, including the identified items of sensitive content, may be displayed within an application window on a display communicatively coupled to the user's computing device. In cases where the content is received in original form (i.e., the received content contains the items of sensitive content in original, unobfuscated form), the user's computing device may use the information provided by the metadata (e.g., location(s) of the identified item(s) of sensitive content, etc.) to obfuscate the items of sensitive content. In an implementation, the user's computing device may provide a control element, such as a toggle control, that allows a user to unobfuscate the displayed obfuscated items of sensitive content. The provided control element may allow the user to obfuscate and unobfuscate the displayed items of sensitive content. In some implementations, the user's computing device may provide such a control element for each obfuscated item of sensitive content being displayed. In an implementation, authentication credentials may be requested when the control element is used to unobfuscate a displayed item or items of sensitive content.

Figure 8:
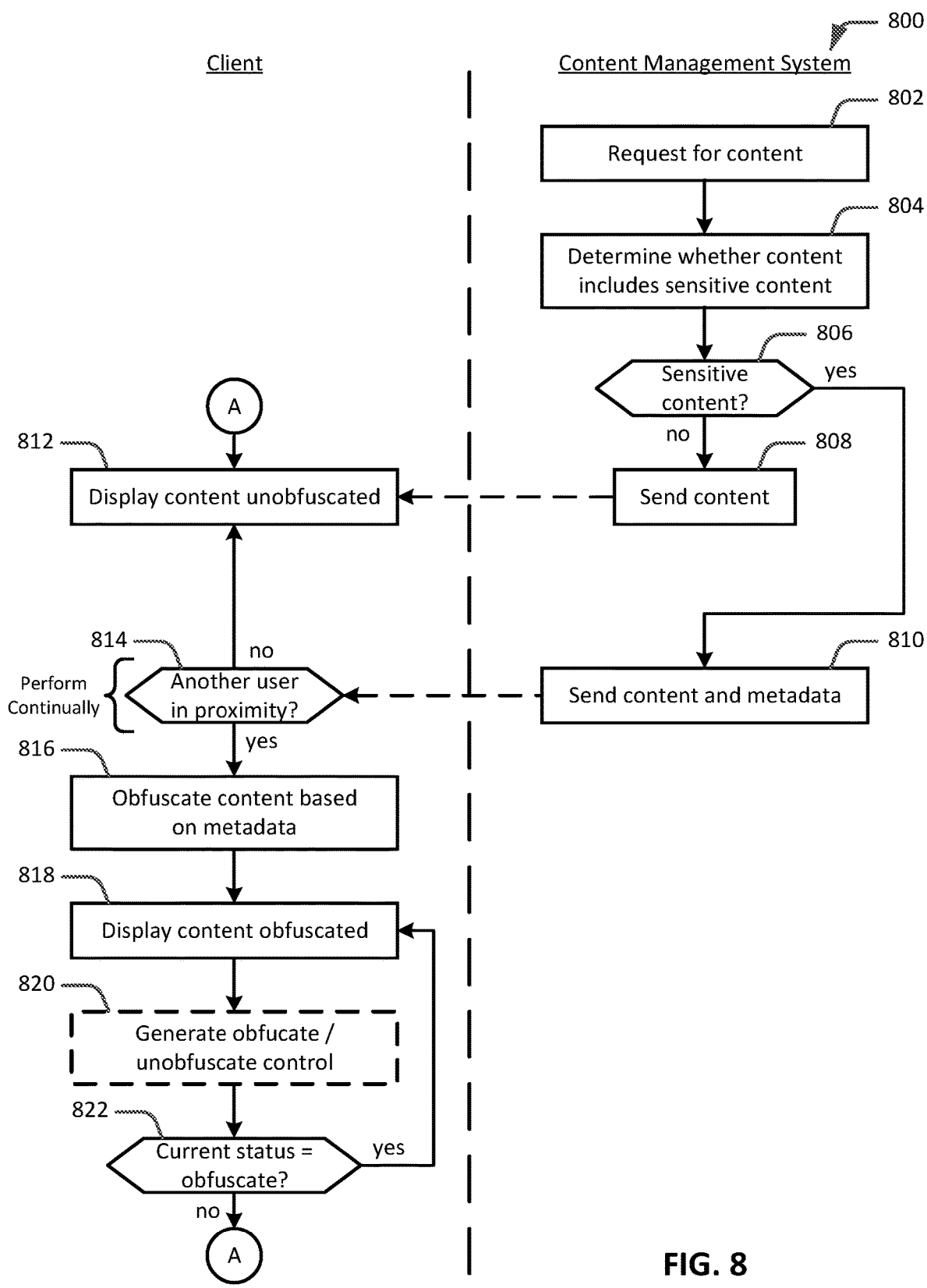
FIG. 8 is a flow diagram of an example process for display of obfuscated sensitive content based on physical proximity, in accordance with an embodiment of the present disclosure.

FIG. 8 is a flow diagram of an example process 800 for display of obfuscated sensitive content based on physical proximity, in accordance with an embodiment of the present disclosure. At 802, sensitive content management system 650 may receive a request for content. For example, a user may be using a computing device, such as computing device 602, and accessing content via a virtual session established between the user's computing device and sensitive content management system 650.

At 804, sensitive content management system 650 may utilize, for example, OCR/DLP service 654 to determine whether the requested content (e.g., the content being accessed by the user's computing device) contains any items of sensitive content (sensitive information). At 806, if a determination is made that the content does not contain sensitive content, then, at 808, sensitive content management system 650 may send the content in its original form to the user's computing device. Sensitive content management system 650 may also provide an indication that the content does not contain any items of sensitive content.

If a determination is made that the content contains one or more items of sensitive content, then, at 810, sensitive content management system 650 may send the content and associated metadata that includes information regarding the identified items of sensitive content. For example, in an implementation, sensitive content management system 650 may send the content in its original form with metadata that provides information regarding the location of the identified items of sensitive content in the content. In another example implementation, sensitive content management system 650 may send the content in a modified form in which the items of sensitive content are obfuscated within the content. In such implementations, sensitive content management system 650 may also send metadata that provides information regarding the locations where the obfuscation is applied and the original content portions for the obfuscated items of sensitive content in the content. In an embodiment, sensitive content management system 650 may encrypt the metadata and send the modified content and encrypted metadata via a secure connection to the user's computing device.

The user's computing device may receive the content from sensitive content management system 650. If the received content does not contain sensitive content, then, at 812, the user's computing device may display the content to be readable or understandable (display the content without obfuscation). Otherwise, if the received content contains sensitive content, then, at 814, the user's computing device may determine whether another user is in physical proximity (i.e., whether another user is in physical proximity of the user's computing device). If a determination is made that there are no other users in physical proximity, then, at 812, the user's computing device may display the content, including the contained items of sensitive content, to be readable or understandable (display non-obfuscated versions of the items of sensitive content).

Otherwise, if a determination is made that another user is in physical proximity, then, at 816, the user's computing device may obfuscate the items of sensitive content contained in the content. The contained items of sensitive content may be obfuscated using information provided by the associated metadata (e.g., location(s) of the identified item(s) of sensitive content in the content, etc.). At 818, the user's computing device may display the content such that the contained items of sensitive content are obfuscated (display the contained items of sensitive content in obfuscated form).

At 820, the user's computing device may optionally provide a control element that may be used to unobfuscate (or obfuscate) the displayed obfuscated (or unobfuscated) item or items of sensitive content. In other words, the control element may allow a user to toggle the obfuscation state of a displayed item or items of sensitive content.

At 822, the user's computing device may check the current status to determine whether to display the items of sensitive content in obfuscated form or to display the items of sensitive content to be readable or understandable. For example, the current status may be determined based on a check of the physical proximity of the user's computing device for the presence of another user (refer to reference numeral 814). The current status may be also determined based on the activation of a provided control element that allows a user to toggle the obfuscation state of a displayed item or items of sensitive content.

If a determination is made that the display of the items of sensitive content should be in obfuscated form, then, at 818, the user's computing device may display the content such that the contained items of sensitive content are obfuscated. Otherwise, if a determination is made that the display of the items of sensitive content should be readable or understandable, then, at 812, the user's computing device may display the content to be readable or understandable.

In an implementation, the physical proximity of the user's computing device may be continually and/or periodically checked for the presence of another user (refer to reference numeral 814). For example, the physical proximity of the user's computing device may be continually and/or periodically checked as long as sensitive content is being displayed on or by the user's computing device. This allows for obfuscating the displayed items of sensitive content upon determining that another user is in physical proximity.

Figure 9:
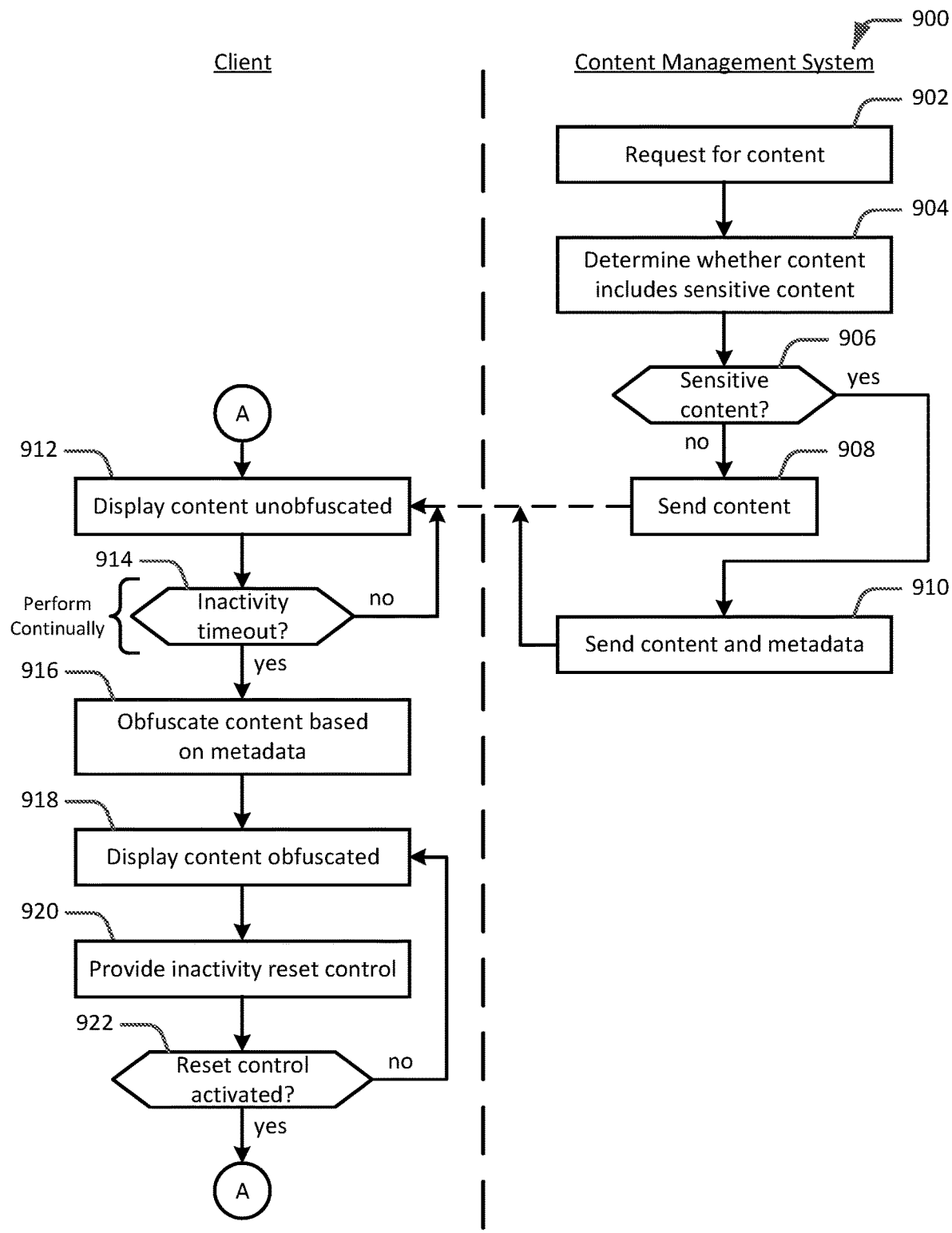
FIG. 9 is a flow diagram of an example process for display of obfuscated sensitive content based on application window idle state, in accordance with an embodiment of the present disclosure.

FIG. 9 is a flow diagram of an example process 900 for display of obfuscated sensitive content based on application window idle state, in accordance with an embodiment of the present disclosure. At 902, sensitive content management system 650 may receive a request for content. At 904, sensitive content management system 650 may determine whether the requested content (e.g., the content being accessed by the user's computing device) contains any items of sensitive content. At 906, if a determination is made that the content does not contain sensitive content, then, at 908, sensitive content management system 650 may send the content in its original form to the user's computing device. If a determination is made that the content contains one or more items of sensitive content, then, at 910, sensitive content management system 650 may send the content and associated metadata that includes information regarding the identified items of sensitive content. The processing of blocks 902-910 may be the same or similar to the processing of blocks 802-810, respectfully, previously described, and that relevant discussion is equally applicable here.

The user's computing device may receive the content from sensitive content management system 650 and, at 912, display the content to be readable or understandable (display the content without obfuscation). For example, in an implementation, the content may be displayed unobfuscated (e.g., to be readable of understandable) in an application window configured with an inactivity timer set to a desired value.

At 914, the user's computing device may check the inactivity timer for the application window for a timeout. In an implementation, the inactivity timer for the application window may be continually and/or periodically checked for a timeout. A timeout of the inactivity timer may be an indication that the user is not interacting with the application window, including any items of sensitive content that may be displayed within the application window. If a determination is made that the inactivity timer has not expired (i.e., no timeout), the user's computing device may, at 912, continue to display the content in the application window to be readable or understandable. Note that the user interacting with the application window may reset the inactivity timer.

Otherwise, if a determination is made that there is a timeout of the inactivity timer, then, at 916, the user's computing device may obfuscate the items of sensitive content contained in the content. The contained items of sensitive content may be obfuscated using information provided by the associated metadata (e.g., location(s) of the identified item(s) of sensitive content in the content, etc.). At 918, the user's computing device may display the content such that the items of sensitive content displayed in the application window are obfuscated. In an implementation, the user's computing device may provide an indication of a reason for the obfuscation (e.g., a notification that an item of sensitive content is obfuscated due to inactivity).

At 920, the user's computing device may provide an inactivity reset control element that may be used to reset the inactivity timer for the application window. A reset of the inactivity timer may cause the obfuscated items of sensitive content displayed in the application window to be unobfuscated. In other words, the inactivity reset control may be activated to cause the display of the items of sensitive content in the application window to be readable or understandable. The inactivity reset control may be activated by the user. Additionally or alternatively, the inactivity reset control may be activated when the user again starts interacting with the application window.

At 922, the user's computing device may check to determine whether the inactivity reset control has been activated. If a determination is made that the inactivity reset control has not been activated, then, at 918, the user's computing device may display the content such that the items of sensitive content displayed in the application window are obfuscated. Otherwise, if a determination is made that the inactivity reset control has been activated, then, at 912, the user's computing device may display the content such that the items of sensitive content displayed in the application window are readable or understandable.

Figure 10:
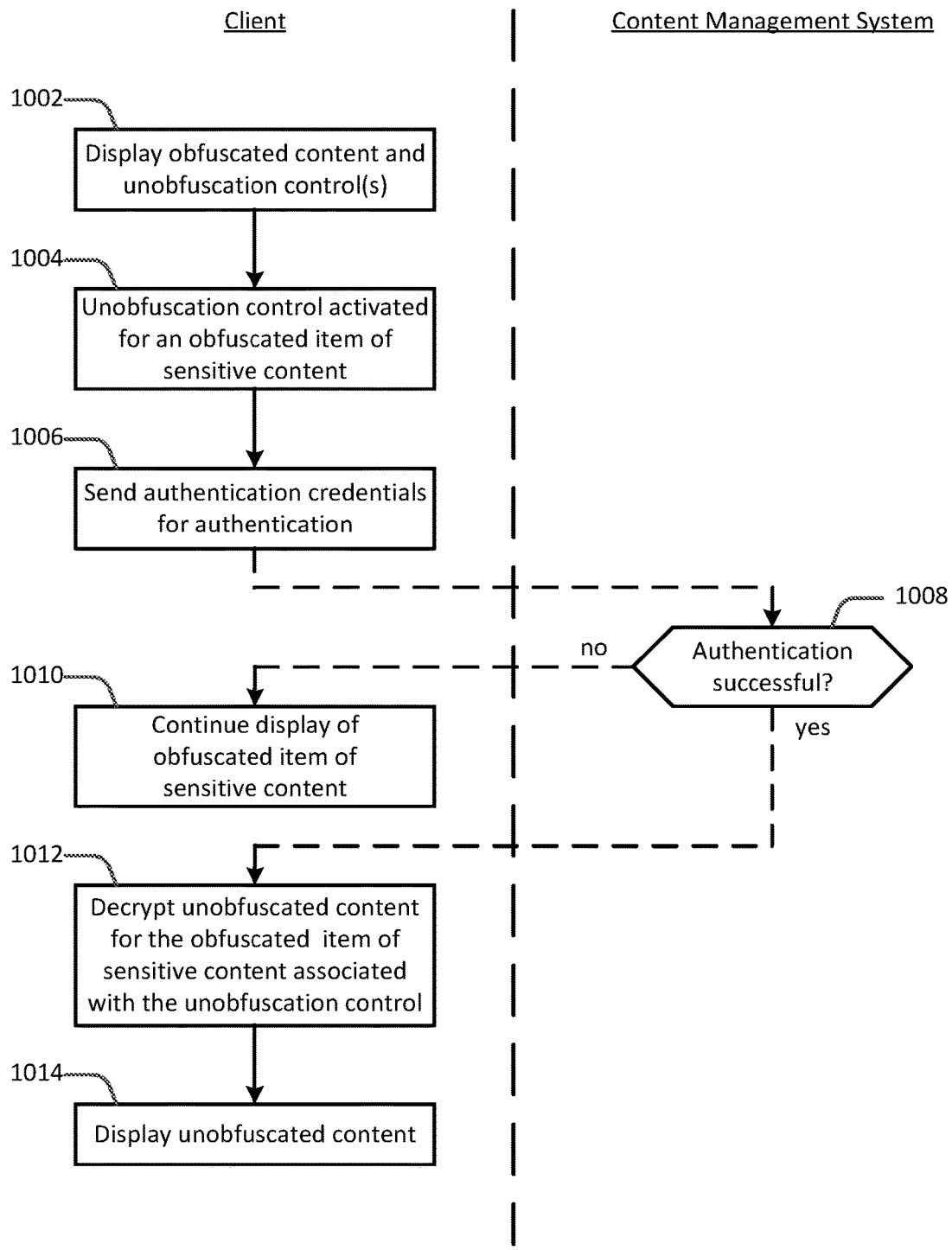
FIG. 10 is a flow diagram of an example process for authentication of an unobfuscation request, in accordance with an embodiment of the present disclosure.

FIG. 10 is a flow diagram of an example process 1000 for authentication of an unobfuscation request, in accordance with an embodiment of the present disclosure. At 1002, a computing device, such as computing device 602, may be displaying obfuscated item or items of sensitive content. The computing device may provide corresponding control elements to unobfuscate an obfuscated item of sensitive content, and an additional control element to unobfuscate all obfuscated items of sensitive content. For example, a user may be using the computing device to access content from sensitive content management system 650. In this example case, the computing device may be displaying the item or items of sensitive content in obfuscated form within an application window in response to a timeout of an inactivity timer associated with the application window.

At 1004, the computing device may determine that a control element to unobfuscate a displayed obfuscated item of sensitive content has been activated. For example, the user may have activated the unobfuscation control element for a particular obfuscated item of sensitive content. In response, the computing device may request and receive from the user the user's authentication credentials.

At 1006, the computing device may send the user's authentication credentials to sensitive content management system 650 for authentication. At 1008, sensitive content management system 650 may utilize a suitable authentication service to verify the received authentication credentials. For example, sensitive content management system 650 may utilize the authentication service to check that the provided authentication credentials match the authentication credentials of a user authorized to access (e.g., view) the item of sensitive content, such as the user who used the computing device to initially access the content from sensitive content management system 650.

If the authentication is not successful, then, at 1010, the computing device may continue to display the item of sensitive content associated with the unobfuscation control element in obfuscated form. In other words, the computing device continues to display the particular obfuscated item of sensitive content for which unobfuscation was requested in obfuscated form.

If the authentication is successful, then, at 1012, the computing device may retrieve the original content portion for the particular obfuscated item of sensitive content from the metadata associated with the content. The original content portion may be used to unobfuscate the particular obfuscated item of sensitive content. In the case the original content portion is encrypted, the computing device may decrypt the original content portion, for example, using a suitable key. At 1014, the computing device may display the particular obfuscated item of sensitive content in unobfuscated form using the original content portion provided by the associated metadata.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
   receiving, by a computing device, content for display, the content including at least one identified item of sensitive content within the content;
   receiving, by the computing device, metadata associated with the content, the metadata is indicative of coordinates of a position of the at least one identified item of sensitive content within the received content and at which to obfuscate display of the at least one identified item of sensitive content;
   determining, by the computing device, at least one contextual factor; and
   responsive to a determination to obfuscate the at least one identified item of sensitive content based on the at least one contextual factor, causing, by the computing device, displaying of the at least one identified item of sensitive content in obfuscated form based on the coordinates.

2. The method of claim 1, wherein displaying the at least one identified item of sensitive content in obfuscated form includes applying an overlay with distortion effects, applying a transformation, adding an artifact, or redacting the at least one identified item of sensitive content.

3. The method of claim 1, wherein determining the at least one contextual factor includes detecting another user being physically proximate to the computing device based on a security zone associated with the computing device.

4. The method of claim 3, wherein detecting the presence of another user in physical proximity to the computing device includes detecting presence within the security zone.

5. The method of claim 1, further comprising, responsive to a determination to not obfuscate the at least one identified item of sensitive content based on at least one contextual factor, displaying a non-obfuscated version of the at least one identified item of sensitive content.

6. The method of claim 1, further comprising displaying, via the computing device, a non-obfuscated version of the at least one identified item of sensitive content within an application window, and wherein determining the at least one contextual factor includes detecting a timeout of an inactivity timer associated with the application window.

7. The method of claim 1, wherein the at least one identified item of sensitive content is displayed in obfuscated form and the method further comprises:
   responsive to a request to unobfuscate the at least one identified item of sensitive content being displayed in obfuscated form,
   authenticating the request to unobfuscate the at least one identified item of sensitive content; and
   displaying of the at least one identified item of sensitive content to be readable.

8. A non-transitory machine-readable medium encoding instructions that when executed by one or more processors cause a process to be carried out, the process comprising:
   receiving content for display, the content including at least one identified item of sensitive content within the content;
   receiving metadata associated with the content, the metadata is indicative of coordinates of a position of the at least one identified item of sensitive content within the received content and at which to obfuscate display of the at least one identified item of sensitive content;
   determining at least one contextual factor; and
   responsive to a determination to obfuscate the at least one identified item of sensitive content based on the at least one contextual factor, causing, by one of the one or more processors, displaying of the at least one identified item of sensitive content in obfuscated form based on the coordinates.

9. The non-transitory machine-readable medium of claim 8, wherein displaying the at least one identified item of sensitive content in obfuscated form includes applying an overlay with distortion effects to the at least one identified item of sensitive content.

10. The non-transitory machine-readable medium of claim 8, wherein displaying the at least one identified item of sensitive content in obfuscated form includes applying a transformation to the at least one identified item of sensitive content.

11. The non-transitory machine-readable medium of claim 8, wherein displaying the at least one identified item of sensitive content in obfuscated form includes redacting the at least one identified item of sensitive content.

12. The non-transitory machine-readable medium of claim 8, wherein determining the at least one contextual factor includes detecting another user being physically proximate to a computing device being used to display the item of sensitive content based on a security zone associated with the computing device.

13. The non-transitory machine-readable medium of claim 12, wherein detecting the presence of another user in physical proximity to the computing device includes detecting presence within the security zone.

14. The non-transitory machine-readable medium of claim 8, the process further comprising, responsive to a determination to not obfuscate the at least one identified item of sensitive content based on at least one contextual factor, displaying a non-obfuscated version of the at least one identified item of sensitive content.

15. The non-transitory machine-readable medium of claim 8, the process further comprising displaying of the at least one identified item of sensitive content to be readable within an application window, and wherein determining the at least one contextual factor includes detecting a timeout of an inactivity timer associated with the application window.

16. The non-transitory machine-readable medium of claim 8, wherein the at least one identified item of sensitive content is displayed in obfuscated form, the process further comprising:
  responsive to a request to unobfuscate the at least one identified item of sensitive content displayed in obfuscated form,
  authenticating the request to unobfuscate the at least one identified item of sensitive content; and
  displaying a non-obfuscated version of the at least one identified item of sensitive content.

17. A system comprising:
  a memory; and
  one or more processors in communication with the memory and configured to:
    receive content for display, the content including at least one identified item of sensitive content within the content;
    receive metadata associated with the content, the metadata is indicative of coordinates of a position of the at least one identified item of sensitive content within the received content and at which to obfuscate display of the at least one identified item of sensitive content;
    determine at least one contextual factor; and
    responsive to a determination to obfuscate the at least one identified item of sensitive content based on the at least one contextual factor, cause one of the one or more processors to display the at least one identified item of sensitive content in obfuscated form based on the coordinates.

18. The system of claim 17, wherein to determine the at least one contextual factor includes to detect another user being physically proximate to a computing device being used to display the at least one identified item of sensitive content.

19. The system of claim 17, wherein the one or more processors in communication with the memory is further configured to, responsive to a determination to not obfuscate the at least one identified item of sensitive content based on at least one contextual factor, cause a non-obfuscated version of the at least one identified item of sensitive content to be displayed.

20. The system of claim 17, wherein the at least one identified item of sensitive content is displayed in obfuscated form, the one or more processors in communication with the memory further configured to:
  responsive to a request to unobfuscate the at least one identified item of sensitive content being displayed in obfuscated form,
  authenticate the request to unobfuscate the at least one identified item of sensitive content; and
  cause a non-obfuscated version of the at least one identified item of sensitive content to be displayed.

* * * * *